(12) United States Patent
Froelich

(10) Patent No.: US 8,760,020 B2
(45) Date of Patent: Jun. 24, 2014

(54) ELECTROMAGNETIC OSCILLATOR WITH ELECTRICAL AND MECHANICAL OUTPUT

(76) Inventor: Michael J. Froelich, North Canton, OH (US)

( * ) Notice: Subject to any disclaimer, the term of this patent is extended or adjusted under 35 U.S.C. 154(b) by 594 days.

(21) Appl. No.: 13/042,558

(22) Filed: Mar. 8, 2011

(65) Prior Publication Data
US 2011/0156513 A1 Jun. 30, 2011

Related U.S. Application Data

(63) Continuation-in-part of application No. 11/977,059, filed on Oct. 23, 2007, now Pat. No. 7,911,096.

(60) Provisional application No. 60/857,944, filed on Nov. 9, 2006.

(51) Int. Cl.
*H02K 7/06* (2006.01)

(52) U.S. Cl.
USPC .............................. 310/80; 310/20

(58) Field of Classification Search
CPC .......... H02K 7/06; H02K 7/065; H02K 49/10
USPC ..................... 310/20, 80, 105, 104
See application file for complete search history.

(56) References Cited

U.S. PATENT DOCUMENTS

| 3,108,163 A | 10/1963 | Kripke et al. |
| 3,899,703 A | 8/1975 | Kinnison |
| 3,967,146 A | 6/1976 | Howard |
| 4,169,983 A | 10/1979 | Felder |
| 4,179,633 A | 12/1979 | Kelly |
| 4,300,067 A * | 11/1981 | Schumann ...................... 310/80 |
| 4,751,486 A | 6/1988 | Minato |
| 5,405,251 A | 4/1995 | Sipin |
| 6,084,322 A | 7/2000 | Rounds |
| 6,781,270 B2 | 8/2004 | Long |
| 7,024,963 B2 | 4/2006 | French |
| 7,151,332 B2 | 12/2006 | Kundel |
| 7,382,106 B2 * | 6/2008 | Kundel ......................... 318/538 |
| 7,385,325 B2 | 6/2008 | Tkadlec |
| 2002/0167235 A1 * | 11/2002 | Long .............................. 310/80 |
| 2004/0041479 A1 | 3/2004 | French |
| 2004/0140722 A1 * | 7/2004 | Long .............................. 310/80 |
| 2007/0210659 A1 | 9/2007 | Long |

* cited by examiner

*Primary Examiner* — Hanh Nguyen
(74) *Attorney, Agent, or Firm* — Sand & Sebolt

(57) ABSTRACT

An oscillator typically includes several rotatable drive magnets and pivotable oscillating arms having respective follower magnets so that the drive magnets drive movement of the follower magnets to pivot the arms back and forth in an oscillating manner. A generating magnet or electrically conductive member may be mounted on each oscillating arm for producing an electric current in the electrically conductive member. Repelling magnets may be mounted on the oscillating arms with respective repelling magnets positioned to repel the first repelling magnet to limit pivotal travel of the oscillating arm.

20 Claims, 23 Drawing Sheets

ELECTROMAGNETIC OSCILLATOR WITH ELECTRICAL AND MECHANICAL OUTPUT

CROSS REFERENCE TO RELATED APPLICATIONS

This application is a continuation-in-part of non-provisional U.S. application Ser. No. 11/977,059, filed Oct. 23, 2007 which claims priority from U.S. Provisional Application Ser. No. 60/857,944 filed Nov. 9, 2006; the disclosure of which is incorporated herein by reference.

BACKGROUND OF THE INVENTION

1. Technical Field

The present invention relates generally to the generation of electricity and the production of mechanical output. More particularly, the invention relates to a higher efficiency generation of electrical power.

2. Background Information

The efficient generation of electrical current and its use for driving mechanical motion which creates the electrical current has been a long sought after goal. While the loss of energy in accordance with the second law of thermodynamics is well known, nonetheless there is always room for improvement in seeking a higher efficiency in such a device. The present invention provides such an improvement.

BRIEF SUMMARY OF THE INVENTION

The present invention provides an apparatus comprising: a rotatable drive shaft; a first drive magnet which rotates with the drive shaft; a first pivotable oscillating arm; and a follower magnet on the first arm which is movable in response to rotational movement of the drive magnet so as to cause the first arm to pivot back and forth in an oscillating manner.

The present invention also provides an apparatus comprising: a first flywheel rotatable about a first axis; a first drive magnet carried by the first flywheel; a second flywheel rotatable about the first axis; a second drive magnet carried by the second flywheel; a first pivotable oscillating arm between the first and second flywheels; a second pivotable oscillating arm between the first and second flywheels; a follower magnet on the first arm which is movable in response to rotational movement of the first drive magnet so as to cause the first arm to pivot back and forth about the first axis in an oscillating manner; and a follower magnet on the second arm which is movable in response to rotational movement of the second drive magnet so as to cause the second arm to pivot back and forth about the first axis in an oscillating manner.

The present invention further provides an apparatus comprising: a frame; a first pivotable oscillating arm which is pivotable back and forth in an oscillating manner; a generating magnet which is mounted on one of the frame and first oscillating arm; and an electrically conductive member which is mounted on the other of the frame and first oscillating arm and in which an electric current is produced in response to oscillating movement of the first oscillating arm to move the one of the generating magnet and electrically conductive member relative to the other of the generating magnet and electrically conductive member.

DETAILED DESCRIPTION OF THE INVENTION

Figure 13:
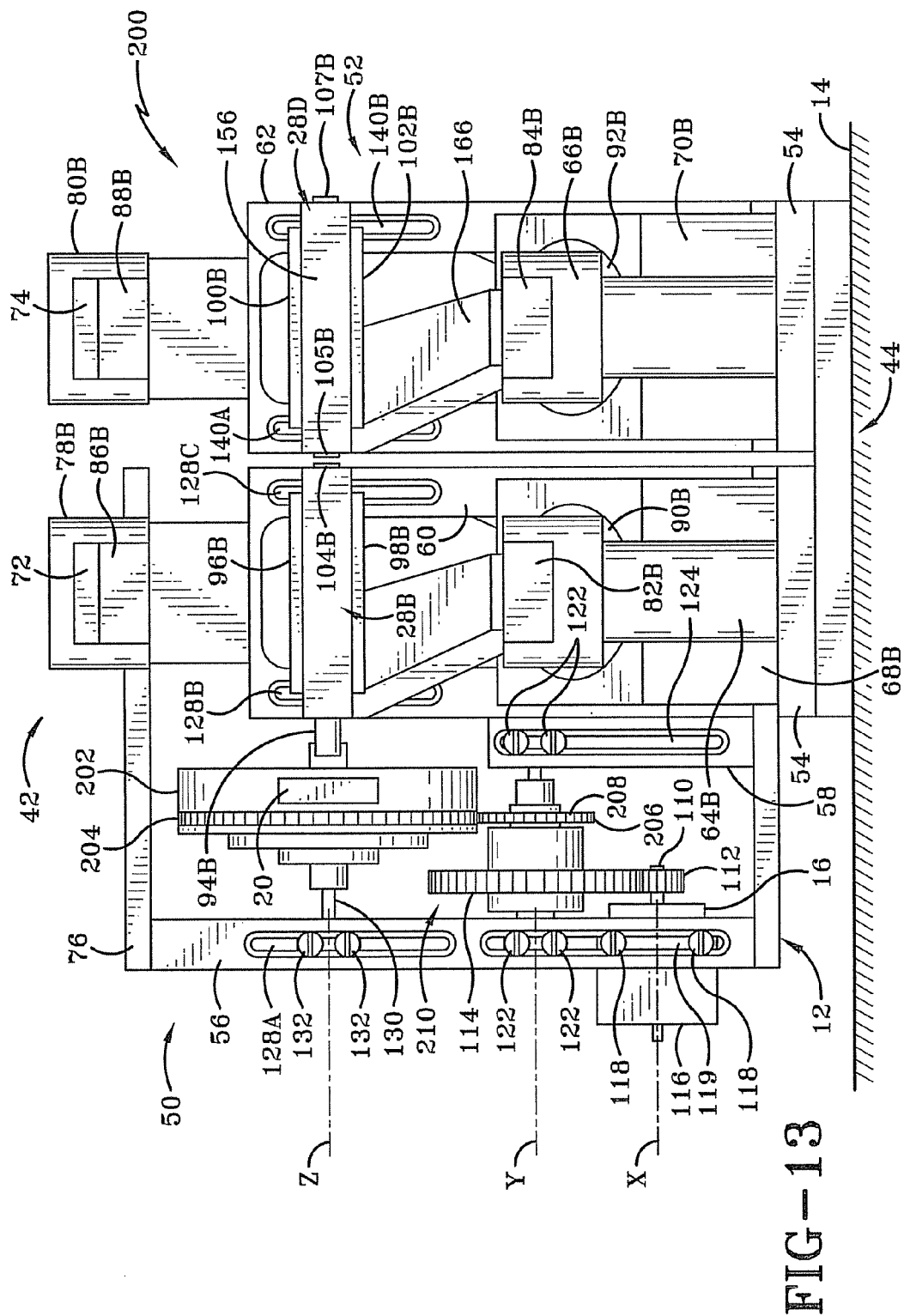
FIG. 13 is a side elevational view of a second embodiment of the present invention similar to FIG. 4 as showing an alternate drive mechanism.
Figure 14:
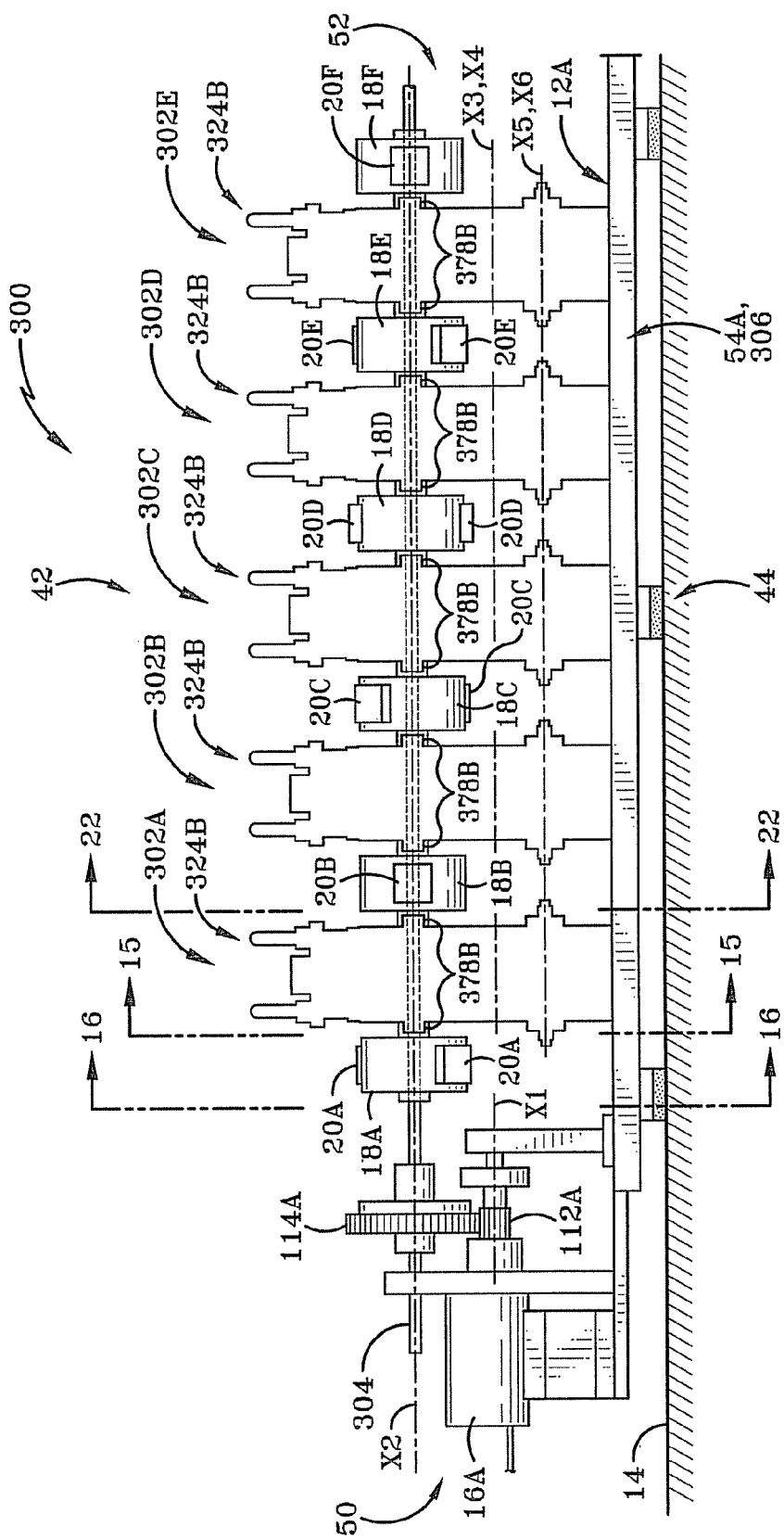
FIG. 14 is a side elevational view of a third embodiment of the oscillator of the present invention.

A first embodiment of the oscillator of the present invention is indicated generally at 10 in FIGS. 1-5; a second embodiment of the oscillator of the present invention as indicated generally at 200 in FIG. 13; and a third embodiment of the oscillator of the present invention is indicated generally at 300 in FIG. 14. Oscillator 10 is configured to be driven by an electric motor to create mechanical motion which generates electricity. More particularly, oscillator 10 includes a frame 12 securely mounted on a support surface 14 so that frame 12 will remain stationary during operation. An electric motor 16 is mounted on frame 12 for driving a rotatable flywheel 18 having a pair of drive magnets 20 mounted thereon in diametrical opposition to one another. An electric DC power source 22 is in electrical communication with motor 16 via conductors 24 which form an electrical circuit which is openable and closable by a switch 26. Oscillator 10 is configured so that rotation of flywheel 18 causes oscillation of oscillating arms 28A-D (FIG. 7) so that generating magnets 30 (FIG. 8) mounted respectively on arms 28 move through respective electrically conductive coils 90 and 92 (FIGS. 4, 5, 8) to produce an alternating current which flows through conductors 34 to a bridge rectifier 36. Rectifier 36 changes the alternating current to a direct current which may be passed through conductors 38 in electrical communication with motor 16 via an electric circuit comprising a switch 40.

Figure 3:
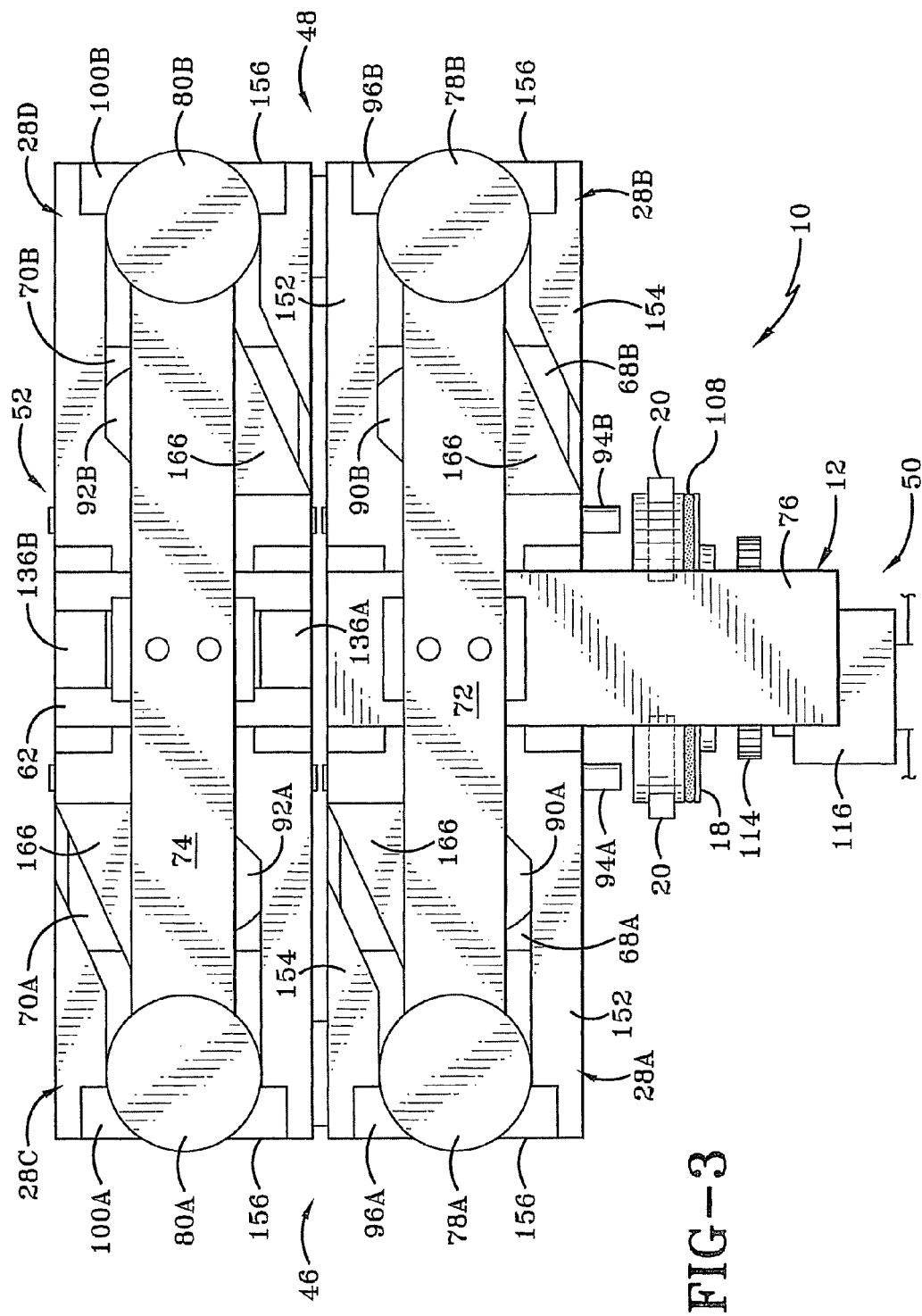
FIG. 3 is a top plan view of the oscillator.
Figure 4:
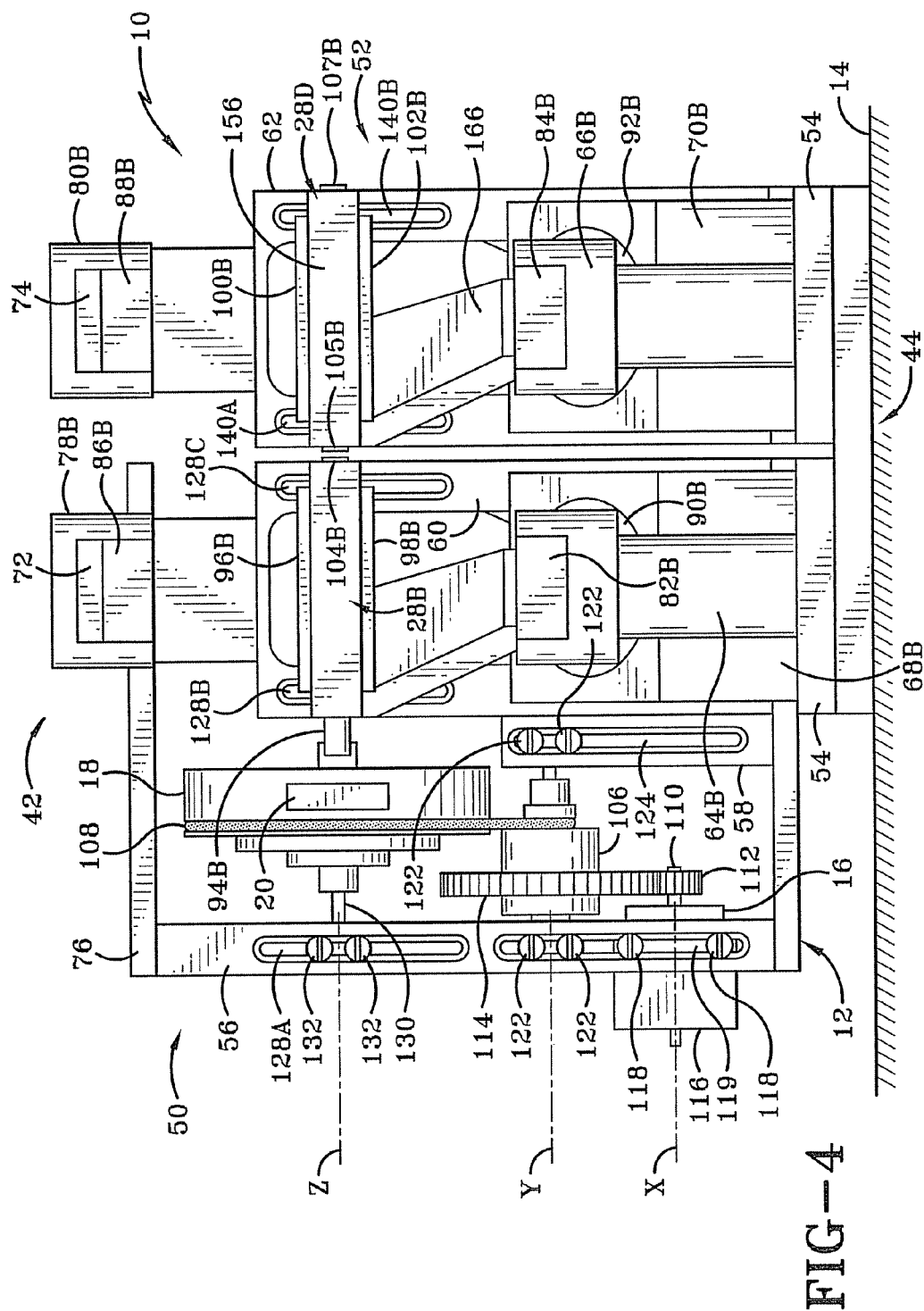
FIG. 4 is a side elevational view of the oscillator as viewed from the right side of FIG. 1.
Figure 5:
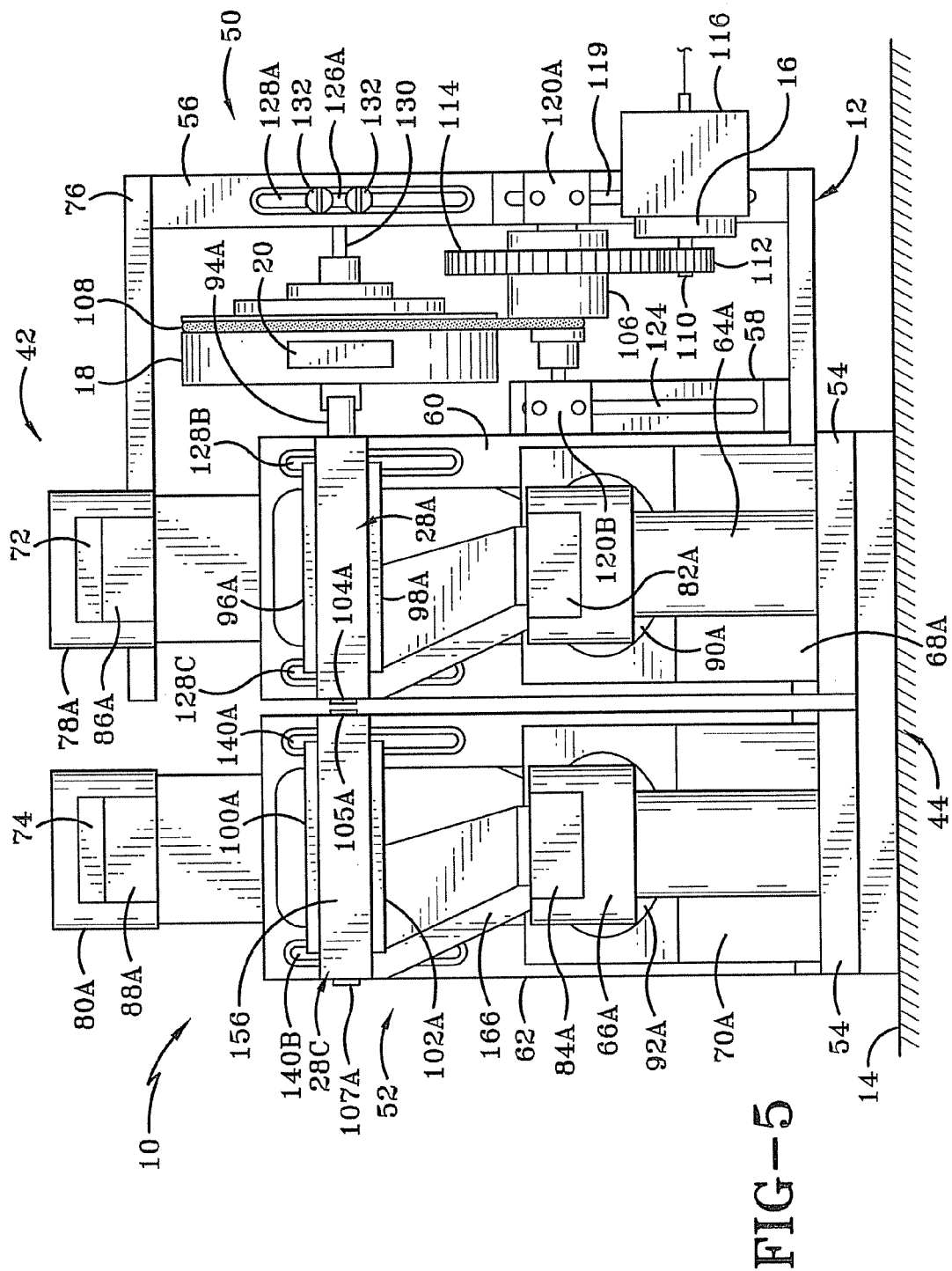
FIG. 5 is a side elevational view as viewed from the left side of FIG. 1.
Figure 6:
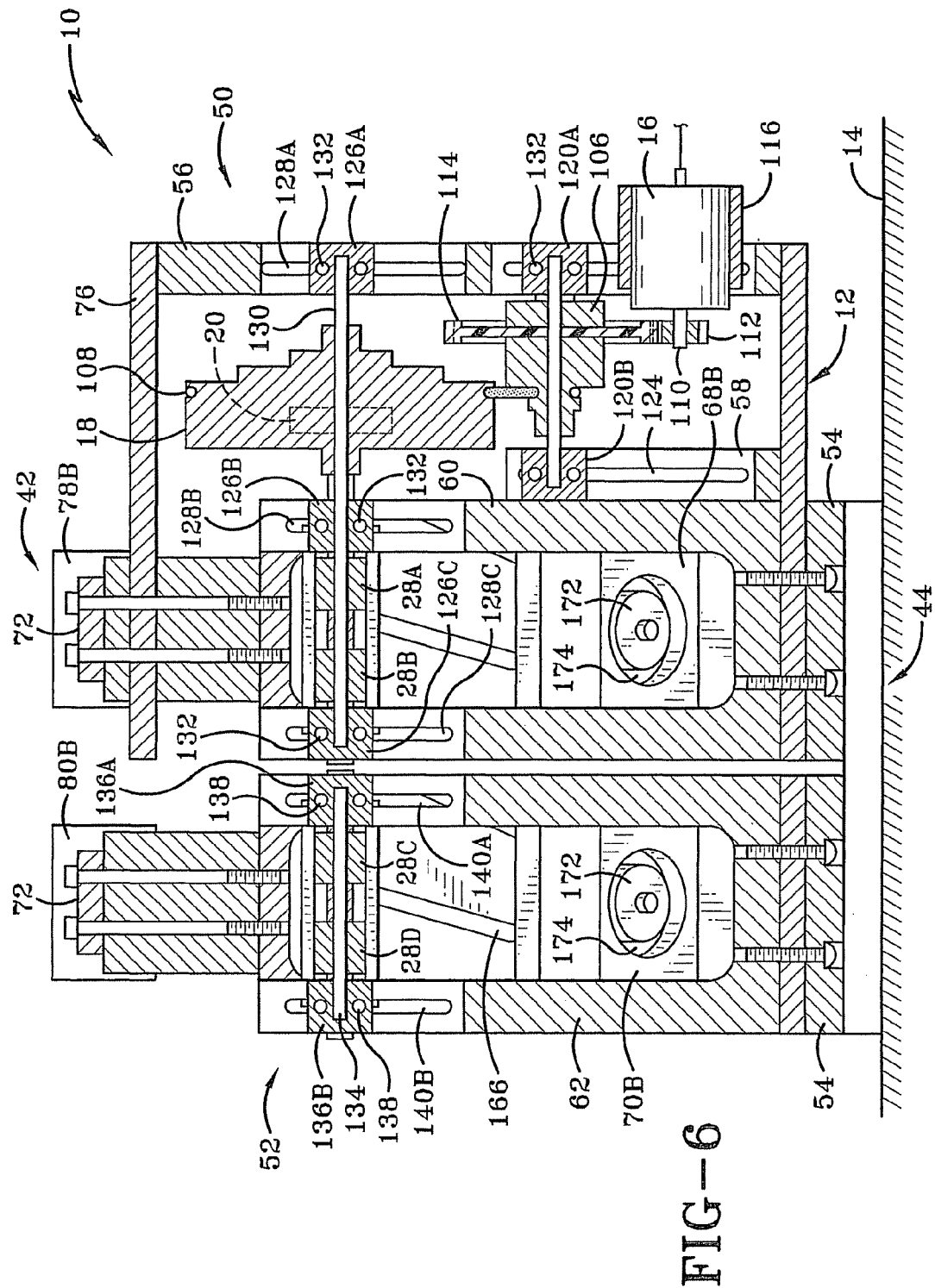
FIG. 6 is a sectional view taken on line 6-6 of FIG. 1.

Oscillator 10 has a top 42, a bottom 44 seated on surface 14, first and second opposed sides 46 and 48, a front 50 and a rear 52 (FIGS. 3-5). Frame 12 includes a base 54 adjacent bottom 44. Frame 12 further includes first, second, third and fourth central mounts 56, 58, 60 and 62 which project upwardly from and are rigidly mounted on base 54 respectively from adjacent front 50 to adjacent rear 52, (FIGS. 4-6). First and second front magnet mounts 64A and 64B (FIG. 1) extend upwardly from base 54 respectively adjacent sides 46 and 48. Likewise, first and second rear magnet mounts 66A and 66B (FIG. 2) project upwardly from base 54 rearwardly of mount 64 and respectively adjacent sides 46 and 48.

First and second front coil mounts 68A and 68B (FIG. 1) project upwardly from base 54. More particularly, mount 68A is disposed between central mount 60 and magnet mount 64A while mount 68B is disposed between central mount 60 and magnet mount 64B. Similarly, rear coil mounts 70A and 70B (FIG. 2) project upwardly from base 54 so that mount 70A is disposed between central mount 62 and magnet mount 66A while mount 70B is disposed between central mount 62 and magnet mount 66B. Front and rear upper supports or crossbars 72 and 74 (FIG. 3) are respectively mounted atop central mounts 60 and 62 and extend laterally outwardly in opposite directions therefrom toward first side 46 and second side 48. A front upper support 76 is mounted on front crossbar 72 and extends forward therefrom to connect to the upper end of central mount 56. Upper front magnet mounts 78A and 78B are mounted on the free ends of crossbar 72 respectively adjacent sides 46 and 48. Likewise, upper rear magnet mounts 80A and 80B (FIG. 3) are mounted adjacent free ends of crossbar 74 respectively adjacent sides 46 and 48.

Lower front repelling magnets 82A and 82B are mounted respectively atop magnet mounts 64A and 64B. Likewise, lower rear repelling magnets 84A and 84B (FIG. 2) are mounted respectively atop magnet mounts 66A and 66B. Upper front repelling magnets 86A and 86B are mounted respectively on the bottom of magnet mounts 78A and 78B. Likewise, upper rear repelling magnets 88A and 88B (FIG. 2) are mounted respectively on the bottom of magnet mounts 80A and 80B. First and second front electrically conductive coils 90A (FIG. 5) and 90B (FIG. 4) are respectively mounted on coil mounts 68A and 68B. Likewise, rear electrically conductive coils 92A (FIG. 5) and 92B (FIG. 4) are respectively mounted on coil mounts 70A and 70B. Follower magnets 94A and 94B (FIGS. 1, 3, 7) are mounted on oscillating arm 28A and are aligned with drive magnets 20 during rotation of flywheel 18.

Front upper drive magnets 96A and 96B are mounted respectively atop oscillating arms 28A and 28B adjacent with respective outer ends thereof and respectively aligned below upper repelling magnets 86A and 86B. Likewise, front lower drive magnets 98A and 98B are mounted respectively on the bottom of arms 28A and 28B directly below drive magnets 96A and 96B and respectively above repelling magnets 82A and 82B. Rear upper follower magnets 100A and 100B (FIG. 2) are mounted respectively atop oscillating arms 28C and 28D adjacent outer ends thereof and respectively below repelling magnets 88A and 88B. Likewise, rear lower follower magnets 102A and 102B are mounted respectively on the bottom of arms 28C and 28D respectively above repelling magnets 84A and 84B. When the oscillating arms are at rest, upper drive magnets 96A and 96B are respectively aligned with upper follower magnets 100A and 100B while lower drive magnets 98A and 98B are respectively aligned with lower follower magnets 102A and 102B. Follower magnets 104A and 104B (FIG. 7) are mounted on arm 28B respectively adjacent and spaced from drive magnet 94A and 94B, being aligned therewith when oscillating arms 28A and 28B are at rest.

Figure 7:
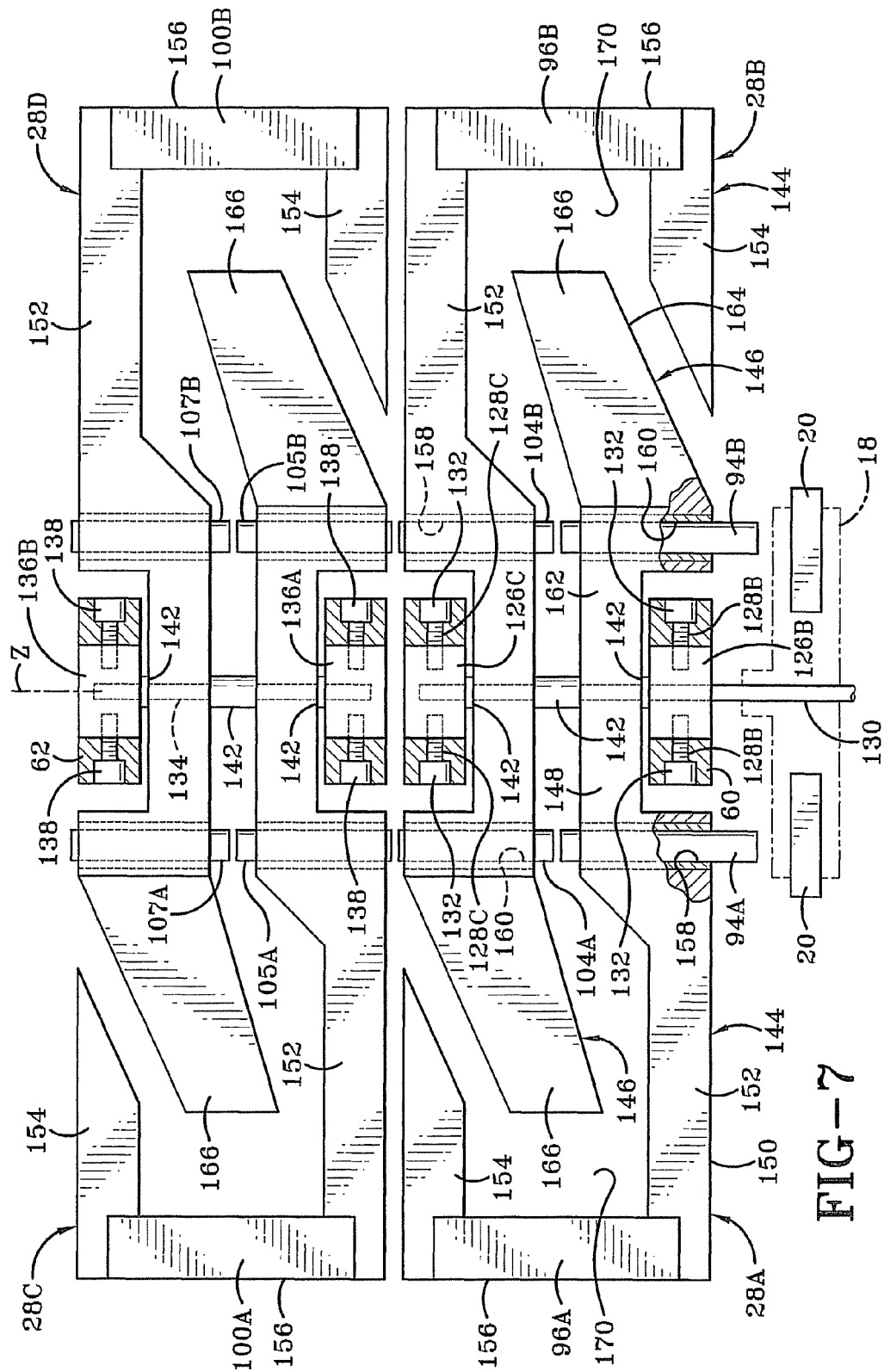
FIG. 7 is a sectional view taken on line 7-7 of FIG. 1 with some of the lower structures removed to show the oscillating arms with greater clarity and the flywheel in phantom.

As best shown in FIG. 7, follower magnets 105A and 105B are mounted on oscillating arm 28C on opposite sides of the axis Z. Likewise, follower magnets 107A and 107B are mounted on oscillating arm 28D on opposite sides of axis Z. Like magnets 94 and magnets 104, magnets 105A and B are equidistant from axis Z, as are magnets 107A and 107B. Also like magnets 94 and 104, magnets 105 and 107 extend all the way through the through holes formed in arms 28C and 28D for respectively receiving said magnets. When oscillating arms 28B and 28C are at rest, magnets 105A and 105B are respectively adjacent and spaced from magnets 104A and 104B and aligned therewith on the opposite ends of magnets 104 from magnets 94. Likewise, when arms 28C and 28D are at rest magnets 107A and 107B are respectively adjacent and spaced from magnets 105A and 105B and aligned therewith on the opposite ends of magnets 105 from magnets 104. Thus, oscillator 10 is configured with an inner set of magnets on the oscillating arms 28 and an outer set of magnets on the oscillating arms 28. More particularly, these inner magnets include magnets 94, 104, 105 and 107 while the outer magnets includes magnets 96, 98, 100 and 102. The inner magnets are disposed radially inwardly of the outer magnets and thus closer to axis Z. When oscillator 10 is at rest, magnets 94A, 104A, 105A and 107A are collinear along a line parallel to axis Z. Likewise, magnets 94B, 104B, 105B and 107B lie along a common line parallel to axis Z when oscillator 10 is at rest. Similarly, magnets 96A and 100A lie along a common line parallel to axis Z when oscillator 10 is at rest, as do respectively magnets 96B and 100B, magnets 98A and 102A, and magnets 98B and 102B. In addition, the inner magnets all lie in a first common plane with axis Z when oscillator 10 is at rest. Outer magnets 96A, 96B, 100A and 100B also lie in a second common plane which is parallel to and above the first plane. Similarly, magnets 98A, 98B, 102A and 102B lie in a third common plane parallel to the other two planes and below the first plane when oscillator 10 is at rest.

Referring to FIGS. 4-5, the drive mechanism which includes motor 16 and flywheel 18 is described in further detail. The drive mechanism further includes a belt drive 106 for driving a belt 108 to drive flywheel 18. Motor 16 includes a rotational output shaft 110 with a small diameter gear wheel or pinion 112 mounted thereon. Shaft 110 and pinion 112 are rotatable about an axis X, belt drive 106 is rotatable about an axis Y and flywheel 18 is rotatable about an axis Z all of which are parallel to one another. Belt drive 106 includes a larger diameter gear wheel 114 which engages and is driven by pinion 112. Belt 108 may be disposed in respective grooves of belt drive 106 and flywheel 108 or may include teeth for respectively engaging teeth formed on drive 106 and flywheel 18 to provide more positive traction. Any suitable mechanism for driving flywheel 18 may be used.

Referring to FIG. 4, motor 16 is mounted on a vertically adjustable motor mount 116 via screws 118 which pass through a slot 119 formed in central mount 56 and threadably engage mount 116. Likewise, belt drive 106 is mounted on front and rear vertically adjustable mounts 120A and 120B (FIG. 5) via a plurality of screws 122 (FIG. 4). A pair of screws 122 pass through slot 119 and threadably engage mount 120A while a pair of screws 122 pass through a slot 124 formed in mount 58 to threadably engage mount 120B. Referring to FIG. 6, flywheel 18 is mounted on a rod 130 which is mounted on vertically adjustable mounts 126A, 126B and 126C via respective screws 132 which pass through respective slots 128A, two of which are formed in forked arms of central mount 56, slots 128B, two of which are formed in forward forked arms of central mount 60 and slots 128C, two of which are formed in rear forked arms of central mount 60.

As shown in FIGS. 6 and 7, oscillating arms 28A and 28B are rotatably mounted on rod 130. Likewise, arms 28C and 28D are rotatably mounted on a rod 134 which is mounted on vertically adjustable mounts 136A and 136B via screws 138 which pass through a pair of front slots 140A formed in front forked arms of central mount 62 and a pair of rear slots 140B formed in a rear forked arm of central mount 62. Various spacers 142 are mounted on rods 130 and 134 to provide the appropriate spacing between mounts 60 and 62 and arms 28. Various bearings (not shown) may be used in the rotational mounting of the various rotatable members such as arms 28 in order to minimize frictional engagement during rotation.

Oscillating arms 28 are described in further detail with reference to FIGS. 1 and 7. Each arm 28 is weight balanced about axis Z in order to provide oscillation about axis Z which is as smooth as possible. Thus, each arm 28 includes first and second sides 144 and 146 having equal weights with respect to axis Z to provide this weight balance. First side 144 includes an inner portion 148 extending radially outwardly from axis Z and an outer U-shaped portion 150 having first and second legs 152 and 154 which extend from an intervening base 156 with first leg 152 connected to inner portion 148. A through passage 158 is formed in inner portion 148 of arm 28A for receiving therein magnet 94A. A passage 158 is also formed in arm 28B for receiving magnet 104B and similar passages are optionally formed in arms 28C-D for receiving magnets therein. Similarly, a through passage 160 is formed in second side 146 of arm 28A for receiving therein magnet 94B. A passage 160 is also formed in arm 28B for receiving magnet 104 and optionally, similar passages may be formed in the remaining arms 28C-D for receiving magnets therein as well.

Figure 1:
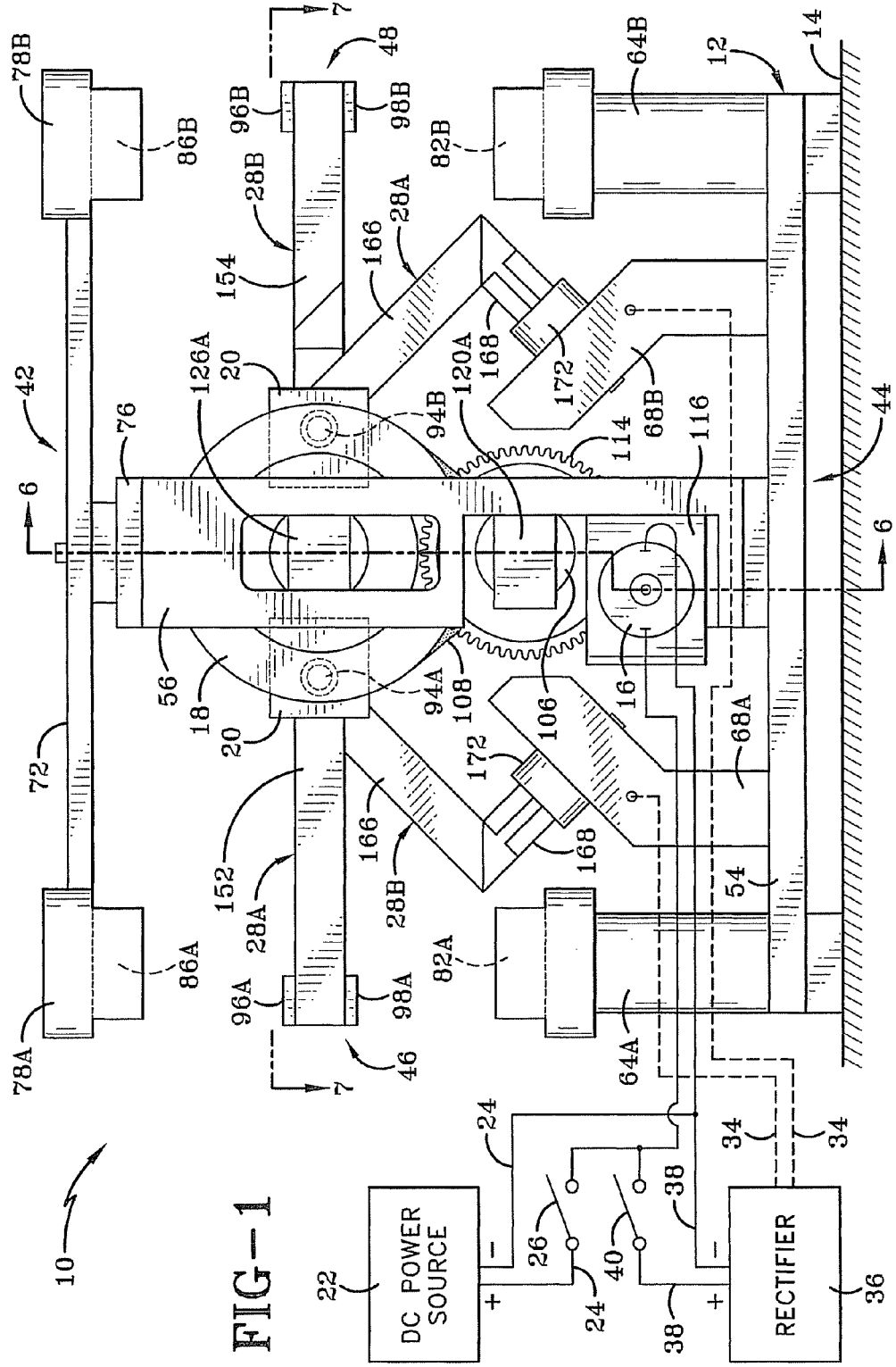
FIG. 1 is a front elevational view of the oscillator of the present invention.
Figure 2:
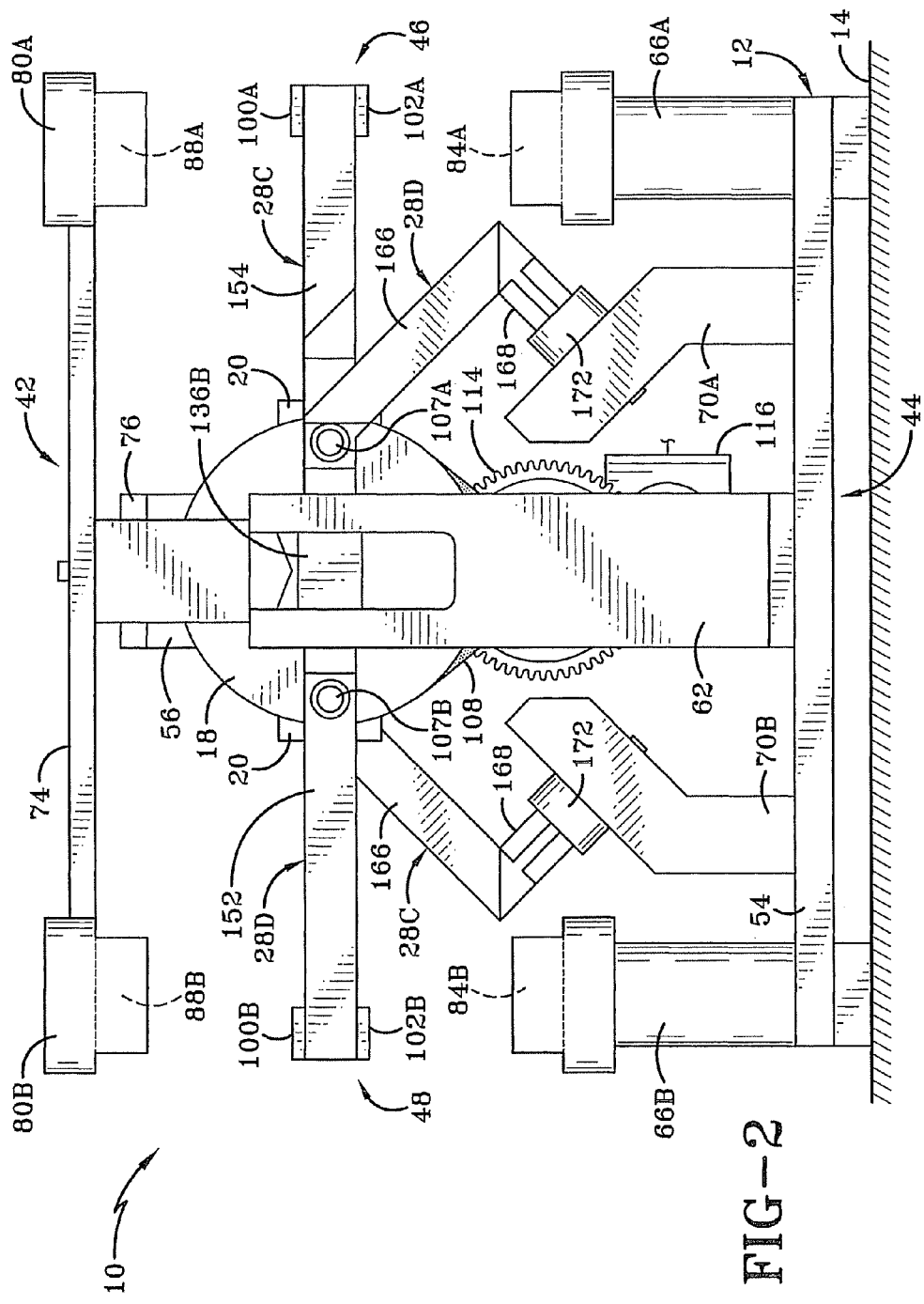
FIG. 2 is a rear elevational view of the oscillator.

Second side 146 of each arm 28 includes an inner portion 162 and an outer L-shaped portion 164 having an upper leg 166 and lower leg 168 (FIG. 1). More particularly, upper leg 166 angles radially outwardly and rearwardly from inner portion 162 so that it is disposed between legs 152 and 154 of the opposing arm 28 as viewed from above. More particularly, each first and second leg 152 and 154 define therebetween a space 170 for receiving therein upper leg 166 and possibly portions of lower leg 168 during oscillation of the respective arms 28. As shown in FIG. 1, lower leg 168 angles downwardly and inwardly from the outer end of upper leg 166 toward the central mounts. Each lower leg 168 serves as a magnet mount for respective generating magnets 30 (FIG. 8) in addition, balancing weights 172 which may or may not be magnetic are mounted on each lower leg 168 in order to provide the weight balance between first and second sides 144 and 146. As shown in FIG. 6, each coil 90 and 92 define a central opening or through passage 174 for receiving therethrough weights 172, magnet 30 and portions of lower leg 168 during the oscillating rotation of respective arms 28.

Figure 8:
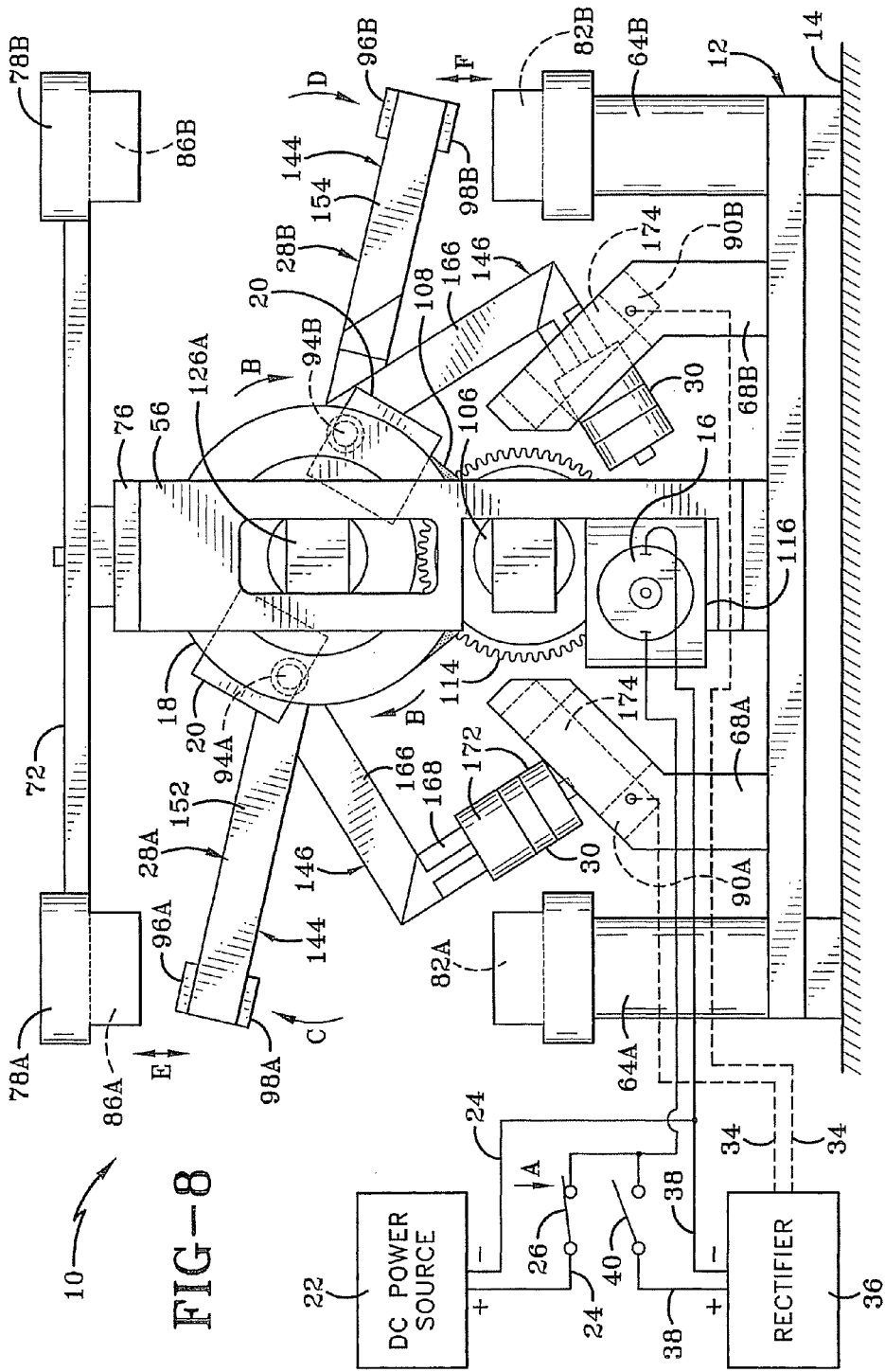
FIG. 8 is an operational view showing the motor powered by the DC power source to drive the flywheel and move the oscillating arms.

The operation of oscillator 10 is described with reference to FIGS. 8-11. Referring to FIG. 8, switch 26 is closed as shown at arrow A in order to form a closed circuit providing electrical power between DC power source 22 and the motor 16 in order to rotate output shaft 110 and pinion 112 (FIG. 4) to drive belt drive 106 via gear wheel 114 thereof to rotate flywheel 18 as shown at arrow B via belt 108. During the rotation of flywheel 18, drive magnet 20 attracts follower magnets 94A and 94B in order to drive them or lead them in the respective direction that each magnet 20 is moving. Thus, if flywheel rotates clockwise as viewed from FIG. 8, the upwardly moving magnet 20 causes follower magnet 94A to move upwardly therewith and the downwardly moving magnet causes follower magnet 94B to move downwardly therewith, thus causing the rotation of arm 28A with first side 144 thereof rotating upwardly as shown at arrow C and second side 146 necessarily rotating downwardly.

Referring to FIGS. 7-8, during the rotational movement of arm 28A, magnets 94A and 94B also serve as drive magnets which drive the movement of oscillating arm 28B by respectively attracting follower magnets 104A and 104B on arm 28B, thus causing arm 28B to rotate along with arm 28A with first side 144 of arm 28B rotating downwardly (Arrow D in FIG. 8) and second side 146 thereof rotating upwardly. During the rotation of arms 28A and 28B, the drive magnets 96 and 98 mounted thereon respectively drive or lead the follower magnets 100 and 102 (FIG. 2) mounted on arms 28C and 28D in order to cause them to rotate in a like manner. That is, arm 28C substantially follows the rotational oscillating path of arm 28A while arm 28D substantially follows the rotational oscillating movement of arm 28B, although the movement of each subsequent arm which is sequentially further away from drive magnet 20 and flywheel 18 is slightly delayed with respect to the adjacent arm which drives it. In addition, during the rotation of arm 28B, magnets 104A and 104B also serve as drive magnets for driving the movement of oscillating arm 28C by respectively attracting follower magnets 105A and 105B on arm 28C, thus causing arm 28C to rotate along with arm 28B. Similarly, during the rotation of arm 28C, magnets 105A and 105B serve as drive magnets for driving the movement of oscillating arm 28D by respectively attracting follower magnets 107A and 107B on arm 28D, thus causing arm 28D to rotate along with arm 28C.

Thus, the magnetic fields of the two magnets 20 on flywheel 18 drives the rotation of arm 28A via interaction with the respective magnetic field of the two magnets 94A and 94B. The two magnets 94A and 94B on the arm 128A via their magnetic fields in turn magnetically drive the rotation of the arm 28B via respective interaction with the magnetic fields of magnets 104A and 104B. Arm 28C is driven both by inner and outer magnets, with magnets 104A and 104B of arm 28B driving magnets 105A and 105B on arm 28C while outer magnets 96A and 98A on arm 28A respectively drive magnets 100A and 102A on arm 28C. Similarly, arm 28D is driven by inner and outer magnets. More particularly, magnets 105A and 105B on arm 28C drive magnets 107A and 107B on arm 28D while outer magnets 96B and 98B on arm 28B respectively drive magnets 100B and 102B on arm 28D. Inner magnets 105 and 107 may be removed from arms 28C and 28D so that only the outer magnets of arms 28A and 28B respectively drive arms 28C and 28D. However, the additional use of inner magnets 105 and 107 provides a stronger magnetic drive between arms 28B and 28C as well as between arms 28C and 28D.

As first side 144 of arm 28A moves upwardly, magnet 96A approaches magnet 86A. Magnets 86A and 96A are positioned to provide a repelling force between one another as indicated at arrow E in FIG. 8. Likewise, as first side 144 of arm 28D rotates downwardly, magnet 98B approaches magnet 82B. Magnets 82B and 98B are also configured to provide a repelling force therebetween as shown at arrow F in FIG. 8. The repelling forces indicated at arrows E and F in FIG. 8 thus help repel or drive arms 28A and 28B in the opposite direction as indicated respectively at arrows G and H in FIG. 9. Meanwhile, magnet 100A on arm 28C is repelled by magnet 88A (FIG. 2) and magnet 102B on arm 28D as repelled by magnet 84B to provide motion respectively similar to that of arms 28A and 28B. Simultaneously, the motion of arm 28A helps to drive the motion of arm 28C via attraction between magnets 96A and 100A as well as between magnets 98A and 102A (FIG. 5). Likewise, the motion of arm 28B helps to drive the motion of arm 28D via the attraction between magnets 96B and 100B as well as between 98B and 102B (FIG. 4).

Figure 9:
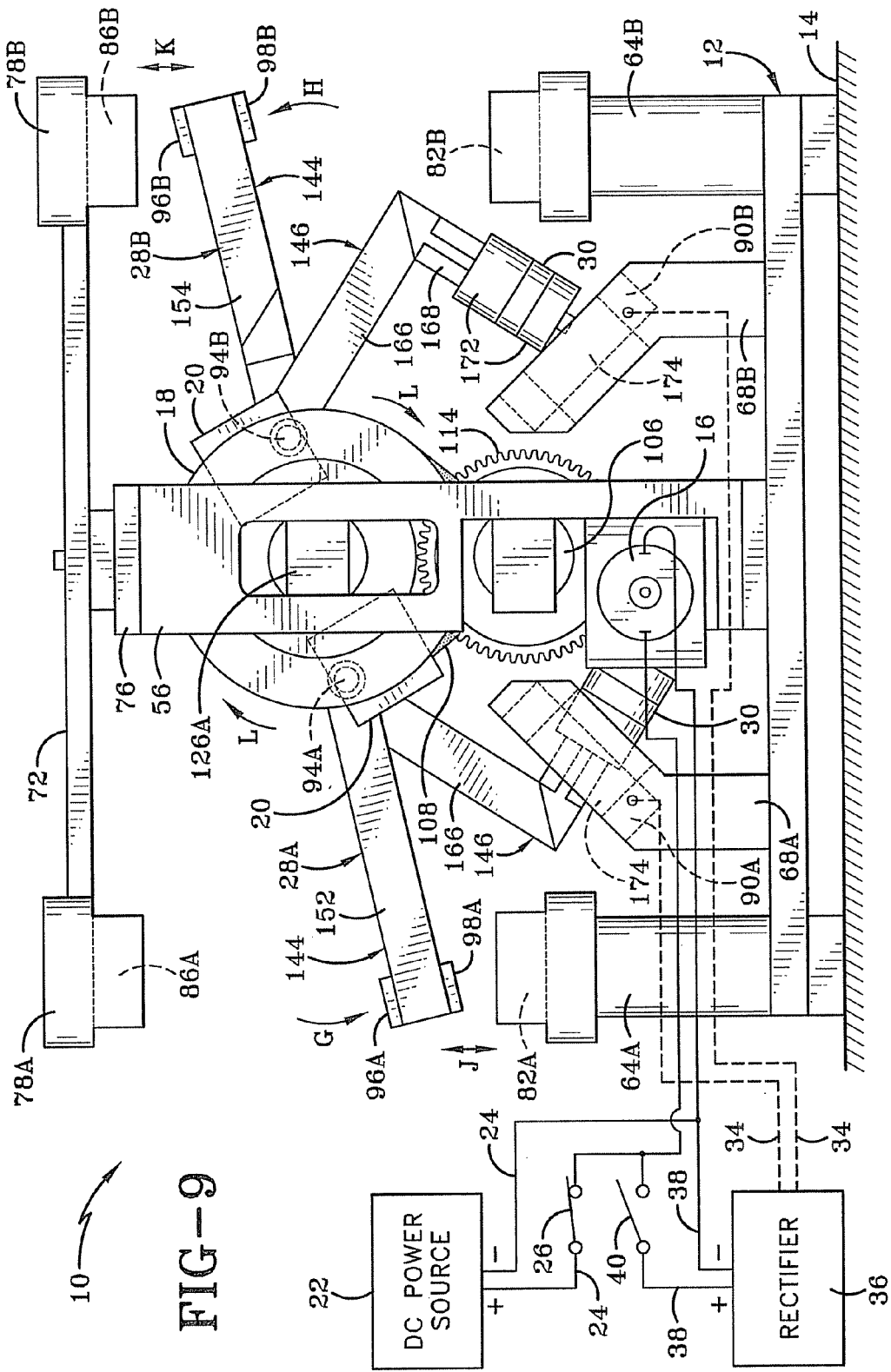
FIG. 9 is a view similar to FIG. 8 showing the oscillating arms oscillated in the opposite direction.

As shown in FIG. 9, the downward rotation of first side 144 of arm 28A causes magnet 98A to approach magnet 82A, which repels magnet 98A as indicated at arrow J in FIG. 9 to help drive arm 28A in the opposite direction as shown in FIG. 8. Likewise, the upward movement of first side 144 of arm 28B causes magnet 96B to approach magnet 86B, causing repulsion therebetween as indicated at arrow K in FIG. 9, thus also helping to drive the rotational motion of arm 28B in the opposite direction as shown in FIG. 8. Meanwhile, motor 16 continues to rotationally drive flywheel 18 as indicated at arrow L at a rate which is suitably timed so that magnets 20 drive magnets 94A and 94B in a synchronized manner with the movement of arms 28 in order to help continue driving them along their oscillating path.

During the back and forth oscillating movement of arms 28, each generating magnet 30 moves back and forth through the respective passage 174 in the respective coil 90 in order to generate an alternating electric current which flows through conductors 34 to rectifier 36 in order to be transformed thereby into DC current. Due to the fact that each oscillating arm 28 is slightly out of oscillating phase with the next adjacent arm 28, proper electrical circuitry and controls (not shown) may be needed in order to provide a phase adjustment of the current produced by each of coils 90 and 92. This is especially true when the number of oscillating arms is substantially increased so that the first oscillating arm is substantially out of phase with the furthermost or other oscillating arms.

Figure 10:
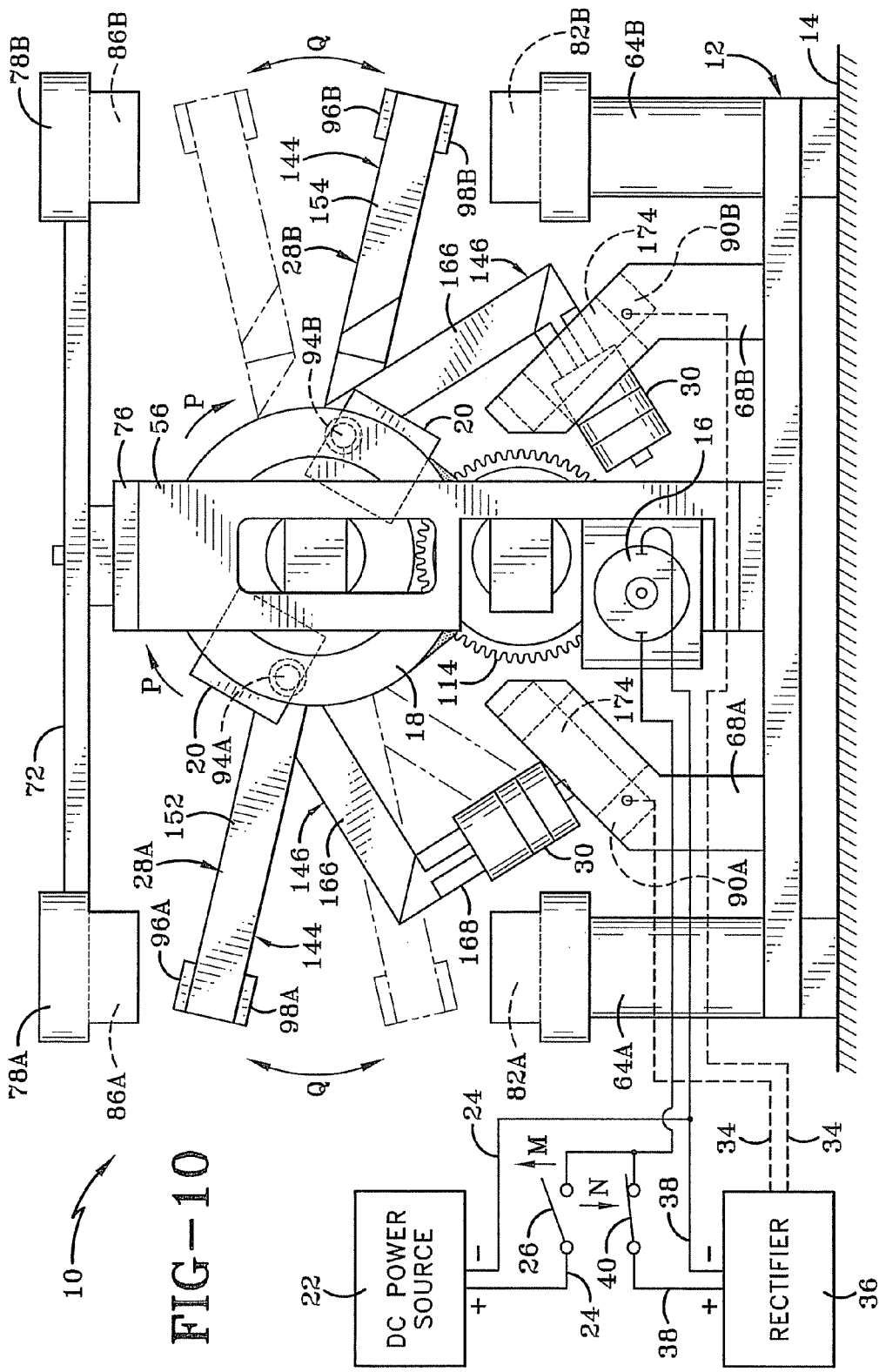
FIG. 10 is a view similar to FIG. 9 and shows the motor being powered by electricity generated via the generating magnets on the oscillating arms and the coils.
Figure 11:
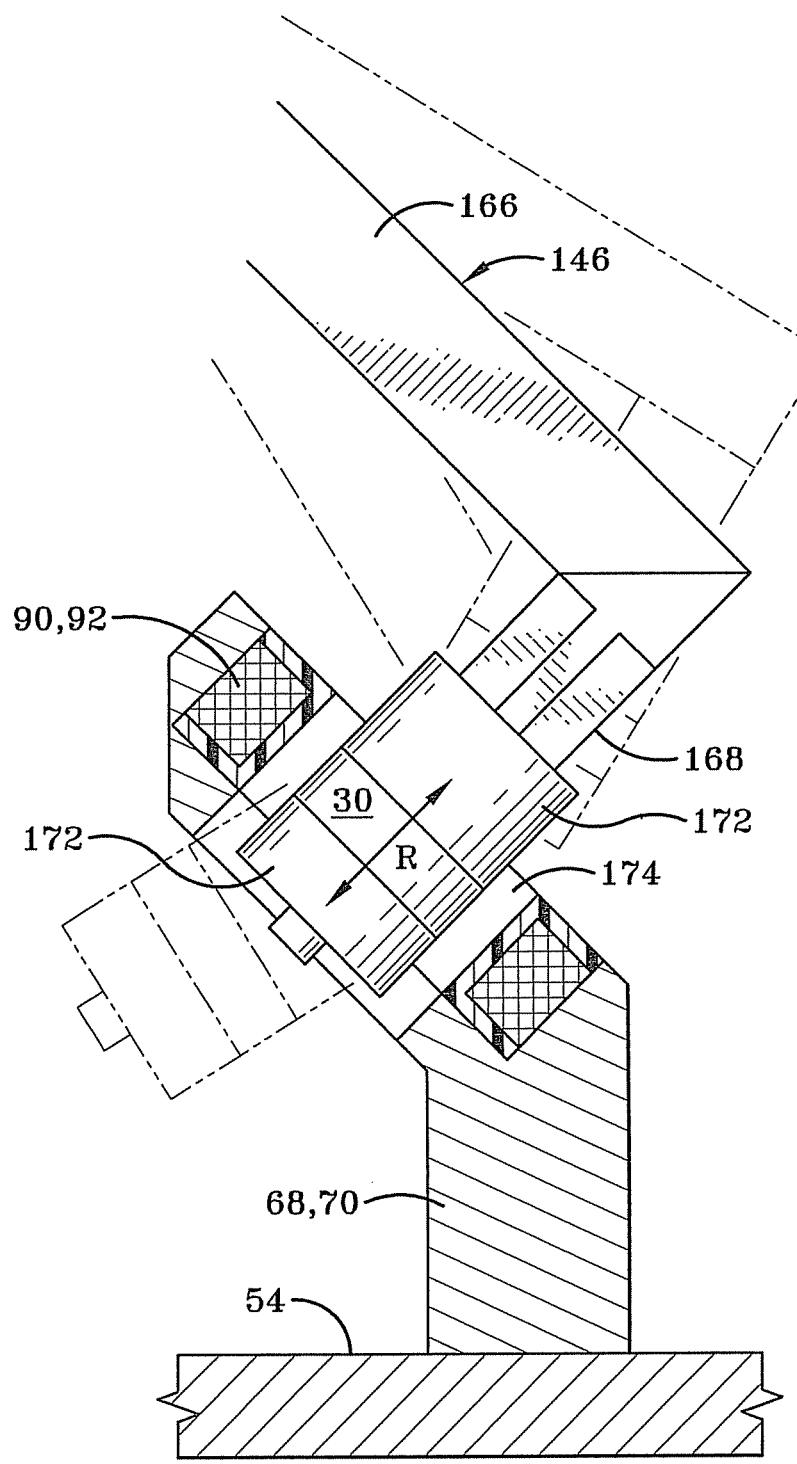
FIG. 11 is an enlarged sectional view through one of the coil mounts and coils showing the movement of the generating magnet associated therewith.

Electrical current produced within coils 30 can offset the electrical load required by a source such as source 22 in order to power motor 16. One scenario is represented in FIG. 10, wherein switch 26 is opened as indicated at arrow M and switch 40 is closed as represented at arrow N. Motor 16 must continue the rotation of flywheel 18 as indicated at arrow P so that oscillating movement of arms 28 continues as indicated at arrow Q in accordance with the previously discussed effects of the various driving magnets, follower magnets and repelling magnets. An enlarged sectional view of FIG. 11 more clearly illustrates the movement of magnet 30 (arrow R) within one of coils 90, 92.

Figure 12:
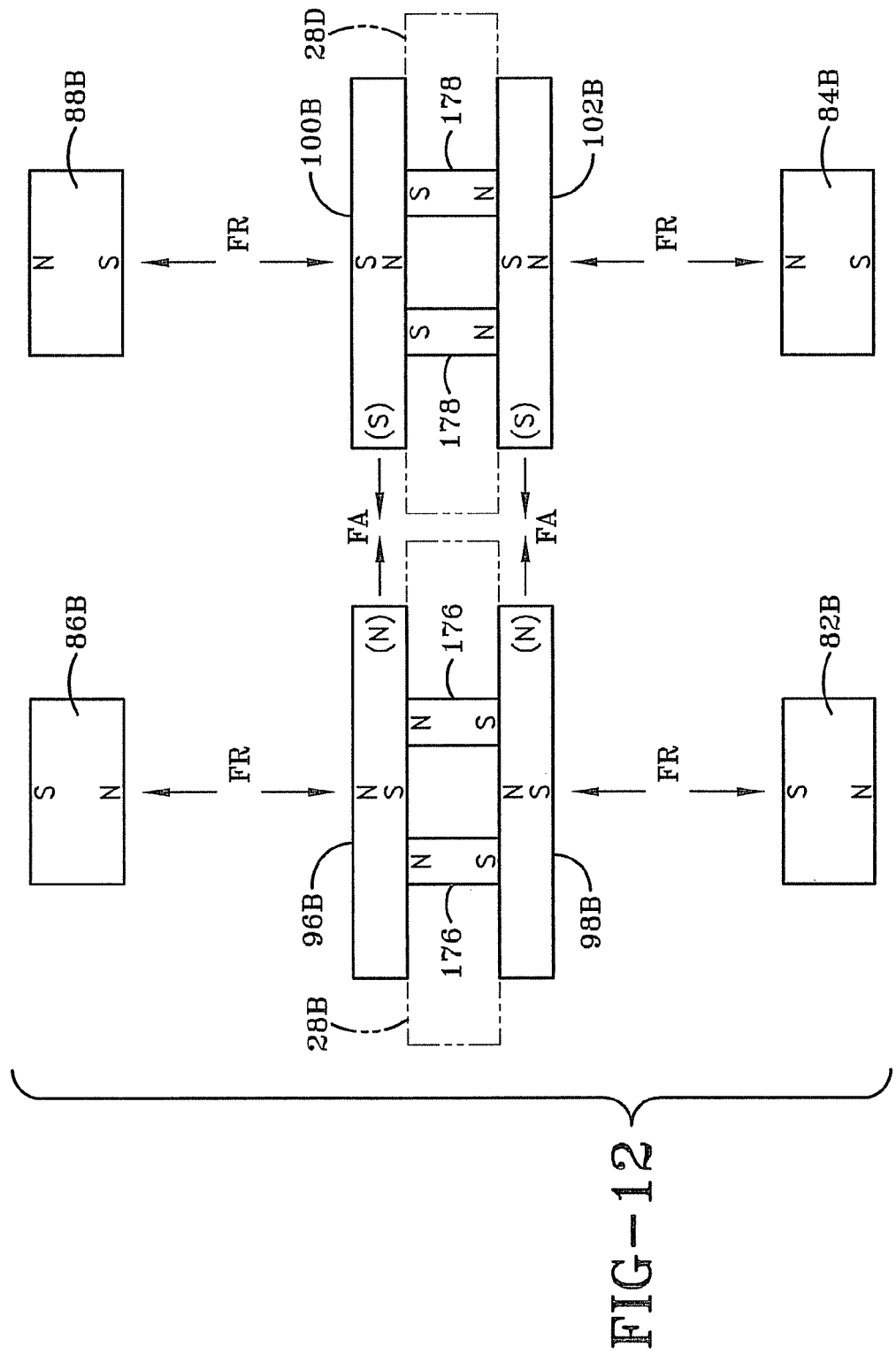
FIG. 12 is a diagrammatic view of the reacting magnets on one side of the oscillator.

FIG. 12 diagrammatically shows the arrangement of the various magnets of oscillator 10 as viewed from second side 48, which is likewise representative of the corresponding magnets on first side 46. FIG. 12 also shows a first pair of optional magnets 176 disposed between magnets 96B and 98B and a second pair of optional magnets 178 positioned between magnets 100B and 102B. Each of the magnets shown in FIG. 12 is oriented with a north and south pole in a vertical fashion as shown in order to provide repelling forces FR and attracting forces FA as indicated by the corresponding arrows in FIG. 12. Each of magnets 96B, 98B, 100B and 102B is marked parenthetically with south or north poles on the lateral ends thereof although this is simply to illustrate that there is an attracting force between magnet 96B and magnet 100B as well as between magnet 98B and magnet 102B.

Thus, oscillator 10 provides a very efficient oscillating movement of arms 28 which is initially driven by motor 16 and powered by DC power source 22 in order to produce electrical current via generating magnets 30 and coils 90 and 92 which may be used to assist in powering motor 16.

Referring to FIG. 13, oscillator 200 is now briefly described. Oscillator 200 is similar to oscillator 10 except that the drive mechanism is somewhat different. In particular, the belt drive system of oscillator 10 has been replaced with a direct gear connection between a flywheel 202 having gear teeth 204 and a small diameter gear or pinion 206 having teeth 208 which engage teeth 204 of flywheel 202. The various gears shown in FIG. 13 provide a gear reduction unit 210 similar to the belt and gear configuration of oscillator 10. Oscillator 200 operates in the same manner as oscillator 10 except for this drive mechanism. Thus, motor 16 is operated to drive rotation of gear 112 via rotational output 110 so that gear 112 drives gear 114. Gear 206 is mounted to rotate with gear 114 and drive the rotation of flywheel 202 so that drive magnets 20 thereon operate in the same manner as oscillator 10 to provide the oscillating movement of the various oscillating arms 28.

It is noted that the oscillating movement of arms 28 is dependent on several factors including the rate at which flywheel 18 rotates or revolves, that is, its revolutions per minute (rpm). In addition, the mass, length and configuration of the oscillating arms, and the strength of the various magnets, polarity thereof and the spacing therebetween are factors affecting how well the oscillating arms will oscillate along with one another. Most preferably, the oscillation of arms 28 will be self starting in response to the rotation of flywheel 18 so that each of arms 28 is driven in the previously described sequential manner and generally in phase with one another aside from the small delay between each adjacent pair of arms 28. However, depending on various factors, application of an additional force to one or more of arms 28 may be needed in order to oscillate them in sync with one another. One example of a non-self starting scenario is the rotational movement of flywheel 18 whereby magnets 20 drive the rotation of arm 28A or arms 28A and B generally in synchronization without driving the oscillation of arms 28C and 28D in general synchronization with arms 28A and 28B. Depending on the various factors such as the rotational speed of flywheel 18, strength of the magnets and so forth, any number of patterns of oscillating movement of arms 28 may occur. Some of these oscillating patterns may have their own value, but in the preferred embodiment, all of the oscillating arms 28 move generally in synchronization with one another aside from the small delay between adjacent pairs as previously discussed.

Oscillator 300 is now described with initial reference to FIG. 14. Oscillator 300 is similar to oscillators 100 and 200 in that oscillator 300 includes several sets of pivotable oscillating arms and is configured to generate electricity. Oscillator 300 has a top and bottom 42 and 44, front and rear ends 50 and 52 defining therebetween an axial direction, and left and right sides 46 and 48 (FIG. 15) defining therebetween a longitudinal direction. Like the earlier oscillators, oscillator 300 includes a rigid frame 12A having a rigid base 54A, the bottom 44 of which is secured to or seated on a support surface 14. Oscillator 300 may include a motor 16A having a rotational output on which is mounted a pinion 112A which is rotatable with the rotational output about a horizontal axially extending axis X1. Pinion 112 engages a gear wheel 114A to drive rotation of gear wheel 114A about an axially extending axis X2 which is offset and parallel to axis X1. Oscillator 300 further includes a plurality of substantially identical rigid flywheels 18A-18F (six shown in FIG. 14) which respectively carry a pair of drive magnets 20A-20F. Oscillator 300 further includes substantially identical oscillating assemblies or generating units 302A-E (five shown diagrammatically in FIG. 14) such that each unit 302 is positioned between an adjacent pair of flywheels 18. A rigid axially elongated drive shaft 304 extends from adjacent front end 50 to adjacent rear end 52 through respective holes formed in each of flywheels 18 and units 302. Gear wheel 114A and flywheels 18 are rigidly secured to and extend radially outwardly from drive shaft 304 whereby drive shaft 304, gear wheel 114A, flywheels 18 and drive magnets 20 are all fixed relative to one another and rotate (Arrow S in FIG. 15) with one another as a unit about axis X2 in a continuous fashion during operation of oscillator 300 in either a clockwise or a counter-clockwise direction. Motor 16A may be in electrical communication with other components in a similar manner as motor 16 is shown in FIG. 1 in electrical communication with DC power source 22 and rectifier mount 36. However, motor 16A represents any drive mechanism which may be used to drive the rotation of drive shaft 304, flywheels 18, magnets 20, and if necessary, gear wheel 14A or the like. Like drive mechanism 16, drive mechanism 16A may be powered by any suitable source of power, such as electric, water, wind, geothermal, solar and so forth.

Figure 16:
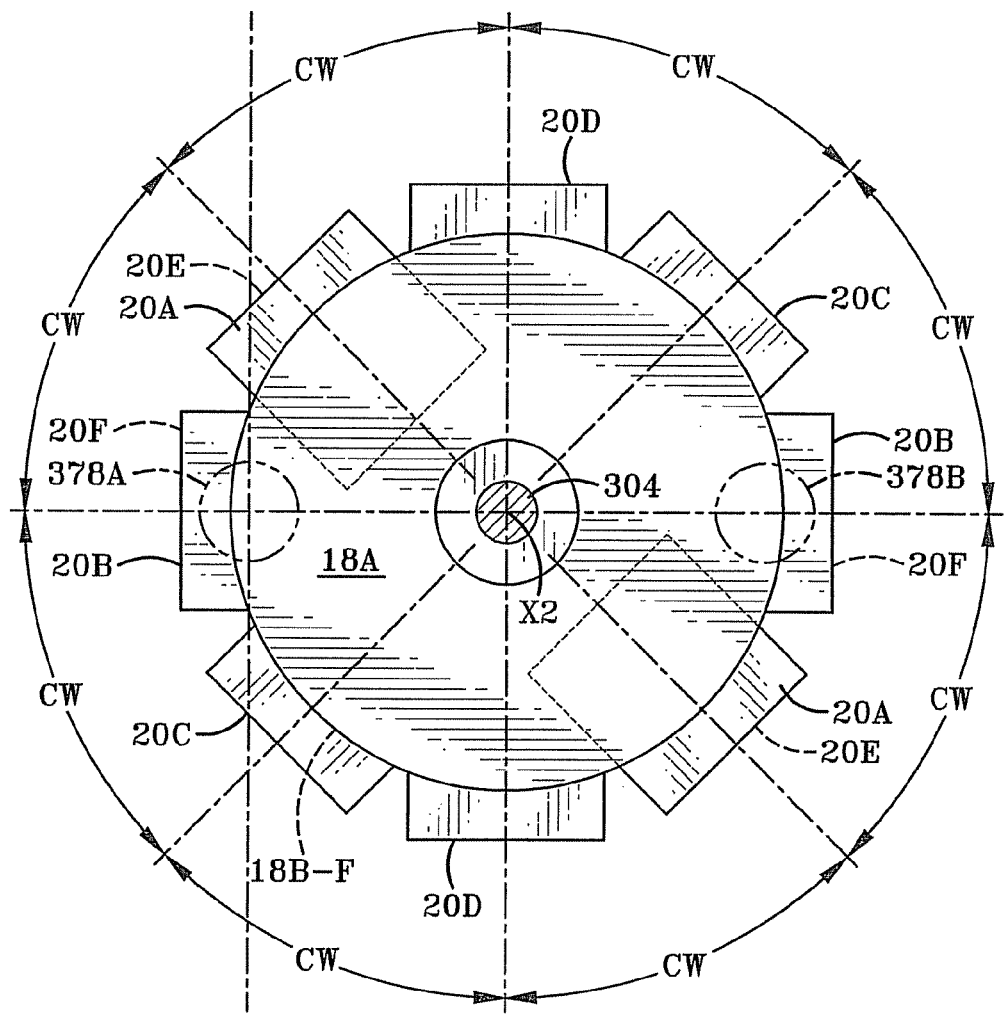
FIG. 16 is a sectional view taken on line 16-16 of FIG. 14 showing only the drive shaft, flywheels, drive magnets and follower magnets (dashed lines) in order to illustrate the offset drive magnets and relationship to the follower magnets.

The positions of magnets 20 is now discussed with primary reference to FIGS. 14 and 16. In the exemplary embodiment, the magnets 20 on a given flywheel 18 are mounted opposite one another such that their radially outwardly facing surfaces face in opposite directions from one another. More particularly, as illustrated with respect to magnets 20A of flywheel 18A, FIG. 16 illustrates that magnets 20A are circumferentially offset by 180 degrees. More particularly, FIG. 16 includes dot dash lines each of which represents a radius of axis X2 passing through the center of one of magnets 20. Each adjacent pair of radii define therebetween a circumferential width CW, as discussed further below. Thus, four times circumferential width CW equals the circumferential width defined between the respective central radii of magnets 20A of flywheel 18A, namely 180 degrees. Likewise, the central radius passing through the center of one of magnets 20B and the central radius passing through the other of magnets 20B define therebetween a circumferential width of 180 degrees. As noted above, this is true of each of the pairs of magnets on each of the flywheels.

As also illustrated in FIGS. 14 and 16, the magnets of each adjacent pair of flywheels is circumferentially offset sequentially. Thus, the magnets 20A of flywheel 18A are circumferentially offset from the magnets 20B of flywheel 18B, which are circumferentially offset from magnets 20C, which are circumferentially offset from the magnets 20D and so forth. More particularly, the center line or central radius of one of magnets 20A and one of magnets 20B define therebetween circumferential width CW, as shown in FIG. 16. Likewise, the central radii of magnet 20B and 20C define therebetween circumferential width CW, and so forth. Thus, the magnets 20A and 20B of the first and second sequential flywheels 18A and 18B have central radii defining therebetween circumferential width CW, as do the magnets 20B and 20C of the second and third sequential flywheels 18B and 18C, and so forth.

As a result, in the exemplary embodiment, the central radii of magnet 20A and 20C of the first and third sequential flywheels 18A and 18C define therebetween two times the width CW, as do the central radii of the magnets 20B and 20D of the second and fourth sequential flywheels 18B and 18C, the central radii of magnets 20C and 20E of the third and fifth sequential flywheels 18C and 18E, and so forth. Further, the central radii of magnets 20A and 20D of the first and fourth sequential flywheels 18A and 18D define therebetween a circumferential width equal to three times width CW, as do the radii of magnets 20B and 20E of the second and fifth flywheels 18B and 18E, and so forth. Also, the radii of magnets 20A and 20E of the first and fifth sequential flywheels 18A and 18E define therebetween a circumferential width which is four times width CW, which is in the in exemplary embodiment 180 degrees. Thus, magnets 20A and 20E are aligned with one another as viewed in the axial direction. Similarly, magnets 20B and 20F are aligned with one another as viewed in the axial direction. In the exemplary embodiment, width CW is about 45 degrees although this may vary substantially. Width CW is typically in the range of about 20 degrees to about 90 degrees and may be less than 20 degrees in a given scenario. In the exemplary embodiment, as viewed rearwardly in the axial direction, and relative to the central radius of magnet 20A, the central radius of magnet 20B is circumferentially offset in the counterclockwise direction by 45 degrees, the central radius of magnet 20C is offset in the counterclockwise direction by 90 degrees, the central radius of magnet 20D is offset in the counterclockwise direction by 135 degrees, and the central radius of one of magnets 20E is offset in the counterclockwise direction by 180 degrees and the other magnets 20E are aligned or not circumferentially offset. With primary reference to FIGS. 15 and 17-19, rigid base 54A of frame 12A includes a pair of spaced parallel rigid axial rails 306 atop which are seated the axially spaced units 302A-E. Each unit 302 includes a rigid lower crossbar 308 which is perpendicular to rails 306 and is rigidly secured at either end thereof to the top of rails 306 and extends therebetween. A rigid central mount or upright 310 is rigidly secured to and extends upwardly vertically from crossbar 308 midway between rails 306. A horizontal longitudinal rigid upper crossbar 312 is rigidly secured to the top of upright 310 parallel to lower crossbar 308 and extends longitudinally to the left and right outwardly therefrom to respective opposed ends whereby upright 310 and crossbar 312 together form a T-shaped configuration, and upright 310 and crossbars 308 and 312 of frame 12A together form an I-shaped configuration as viewed in the axial direction. A pair of rigid mounting brackets 313 are secured to upright 310 spaced upwardly from and adjacent lower crossbar 308 and extend respectively longitudinally to the left and right from upright 310 a short distance.

Left and right rigid lower magnet mounts 314A and 314B of frame 12A are rigidly secured to crossbar 308 adjacent its respective opposed ends and adjacent rails 306 and extend upwardly therefrom so that mounts 314A and B are spaced respectively to the left and right of upright 310 on opposed sides thereof. Left and right rigid upper magnet mounts 316A and 316B of frame 12A are rigidly secured to and extend downwardly from the opposed ends of upper crossbar 312 substantially directly above the left and right lower mounts 314A and B respectively so that left and right upper mounts 316A and B are longitudinally spaced to the left and right and thus on opposite sides of upright 310. Left and right lower repelling magnets 318A and 318B are rigidly secured respectively to left and right lower mounts 314A and 314B so that they are longitudinally spaced to the left and right of upright 310, shaft 304, axes X1-X6, flywheels 18 and magnets 20. Upper repelling magnets 320A and B are respectively rigidly secured to upper magnet mounts 316A and B such that magnets 320A and 320B are also longitudinally spaced to the left and right of upright 310, shaft 304, axes X1-X6, flywheels 18 and magnets 20. Magnets 320A and B are respectively substantially directly above lower magnets 318A and 318B respectively.

Figure 17:
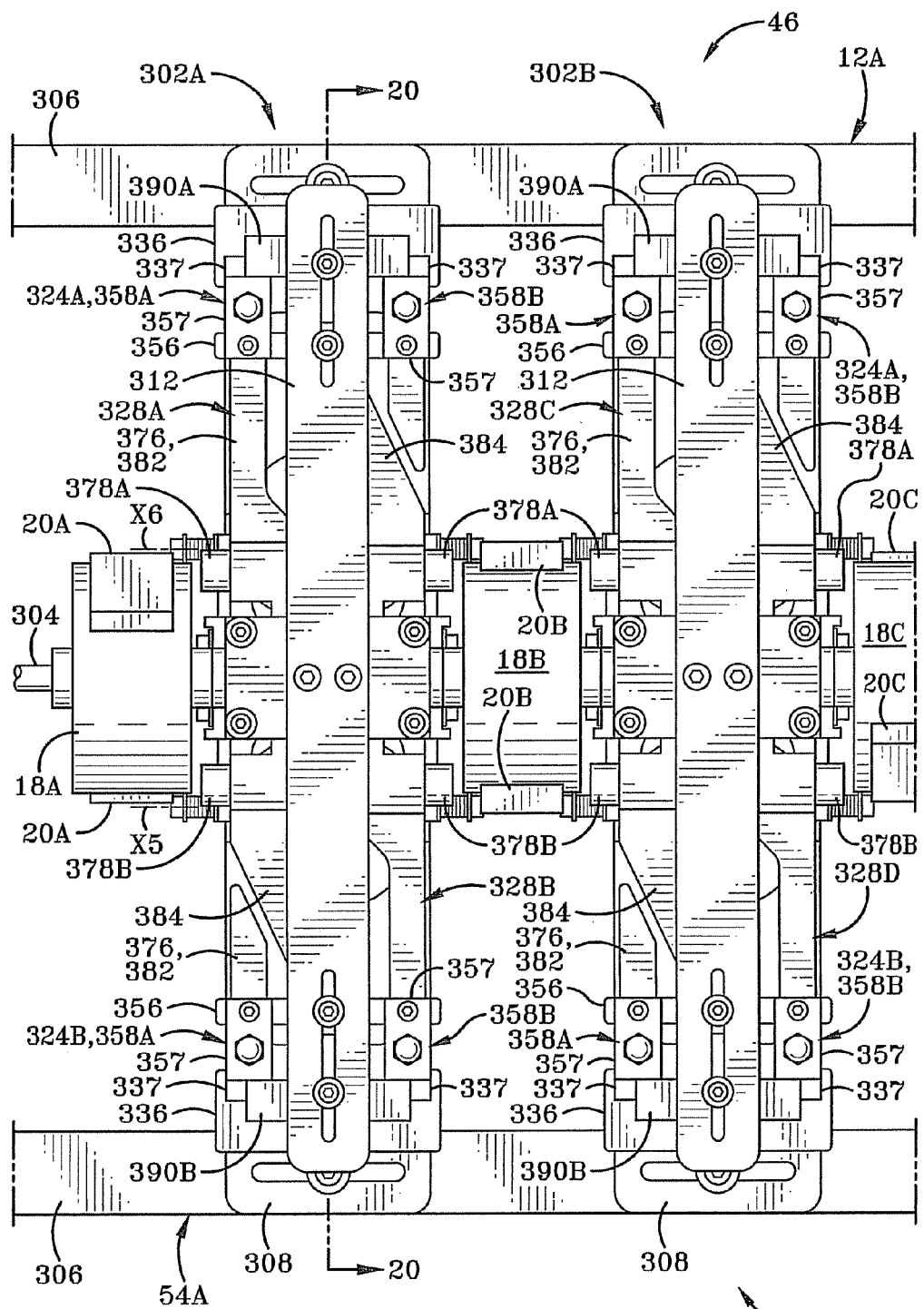
FIG. 17 is a top plan view of a portion of the third embodiment showing two sets of the oscillating arms and three of the flywheels with portions cut away.
Figure 18:
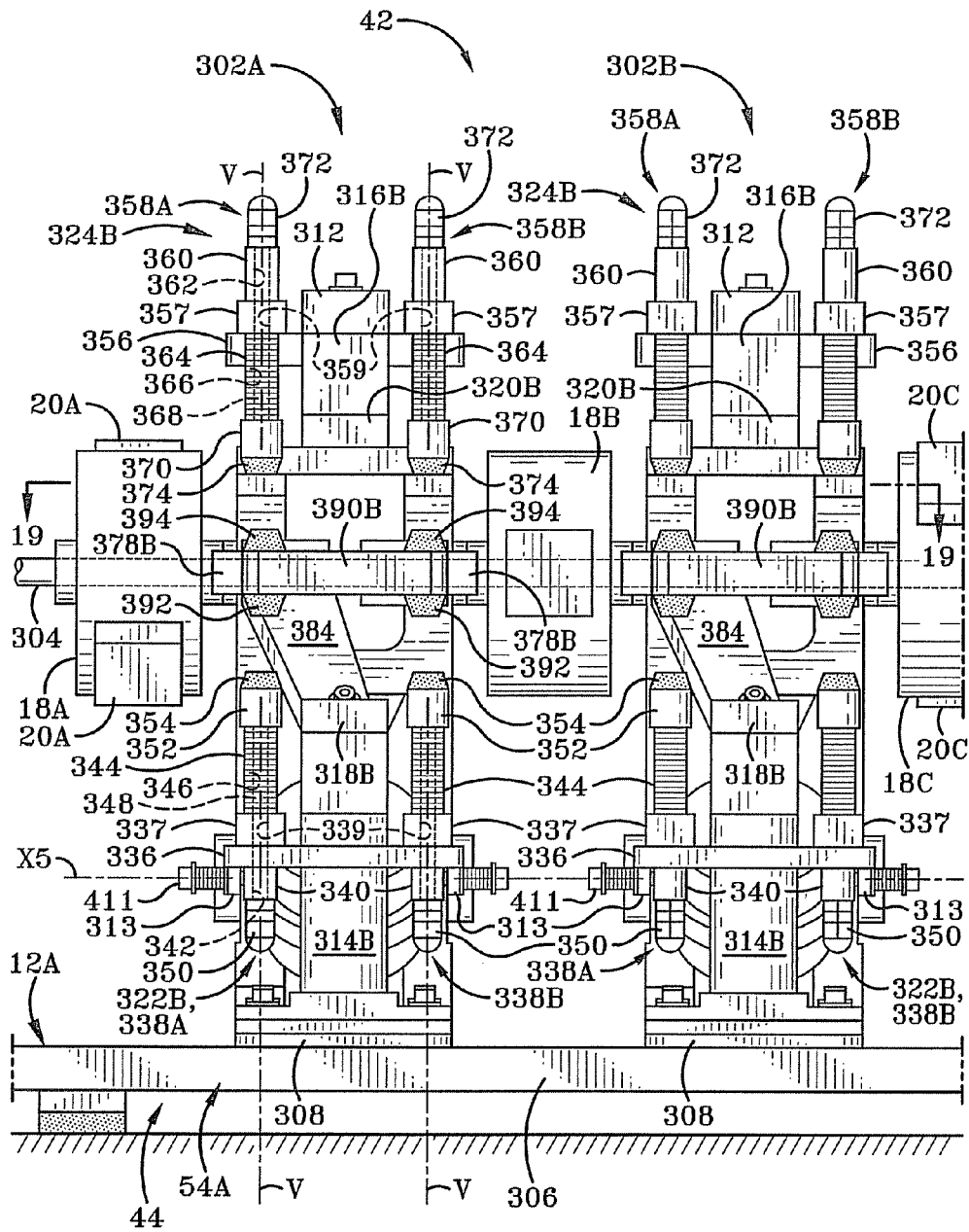
FIG. 18 is a side elevational view of the portion of the third embodiment shown in FIG. 17.
Figure 19:
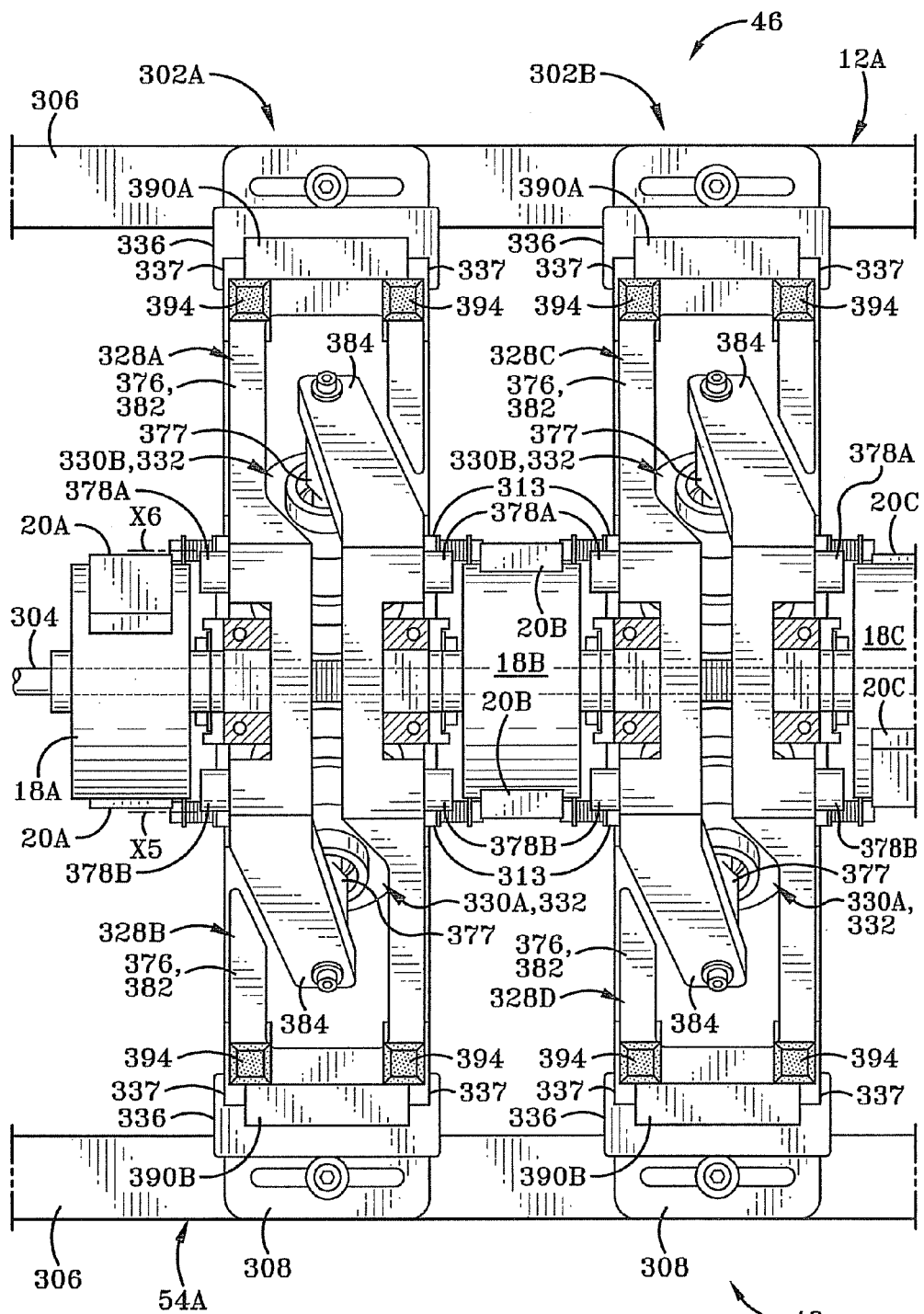
FIG. 19 is a sectional view taken on line 19-19 of FIG. 18 looking downwardly.
Figure 20:
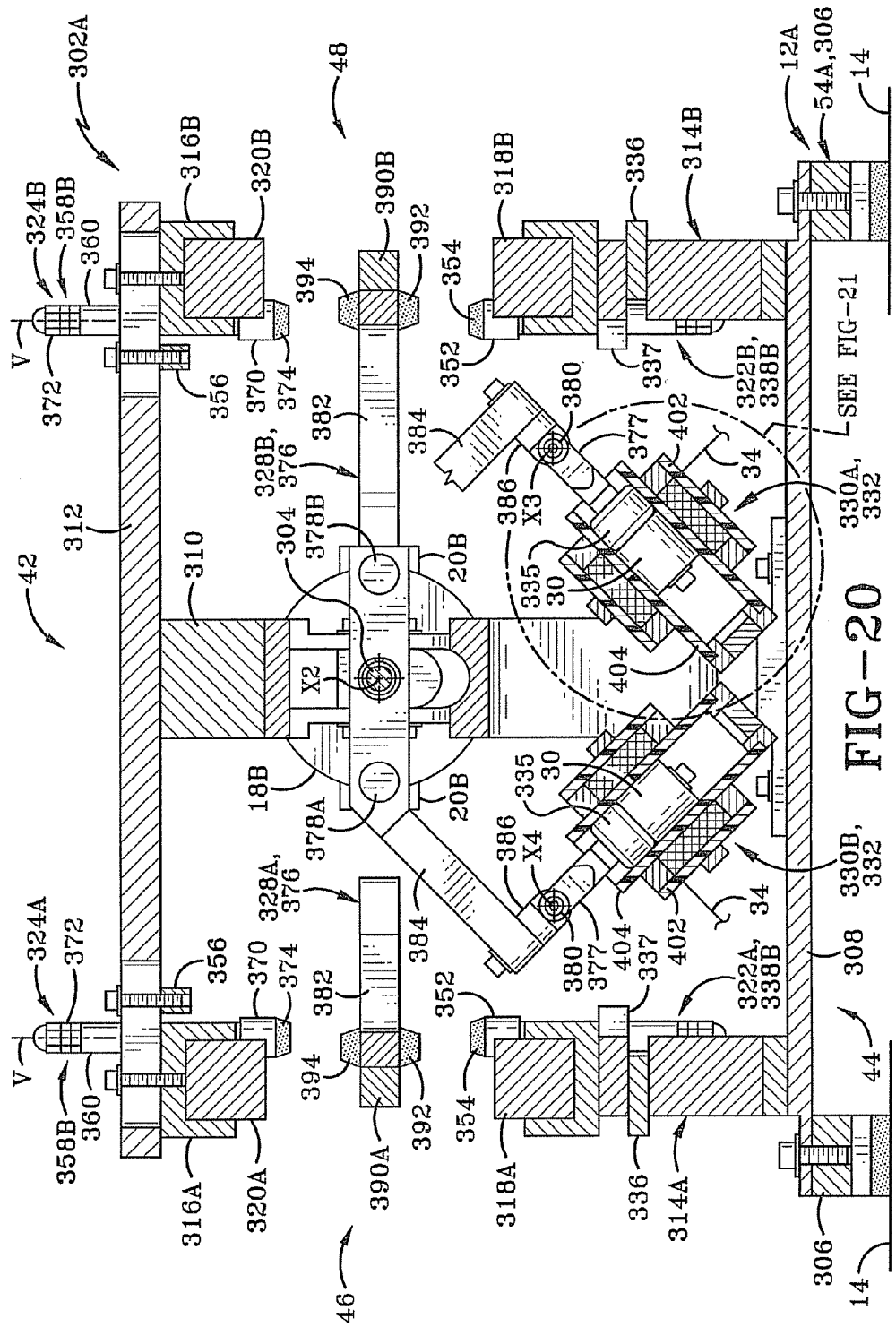
FIG. 20 is a sectional view taken on line 20-20 of FIG. 17.
Figure 21:
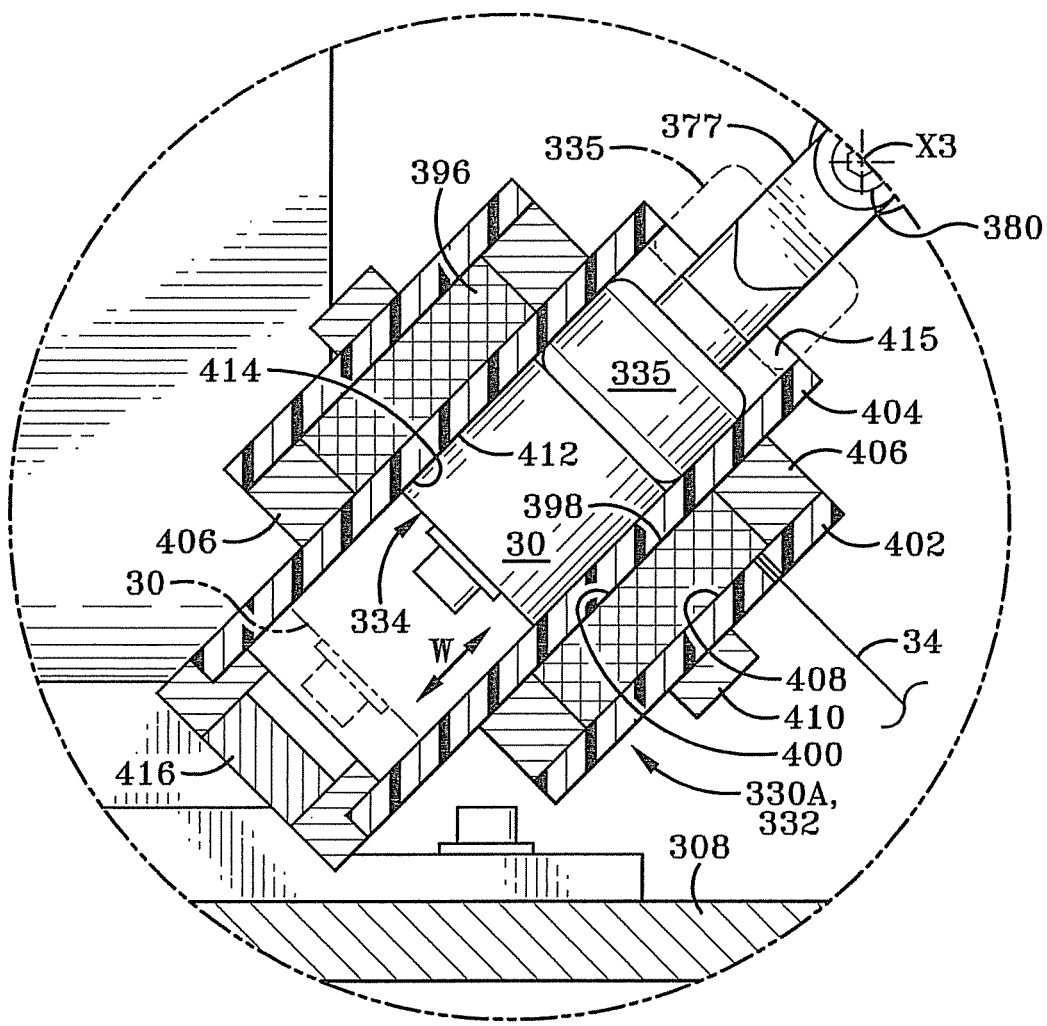
FIG. 21 is an enlarged view of the encircled portion of FIG. 20.

Each unit 302 further includes left and right lower rebound assemblies 322A and 322B which are respectively adjacent the left and right lower repelling magnets 318A and 318B. Each unit 302 further includes left and right upper rebound assembly 324A and 324B respectively adjacent the left and right upper magnets 320A and 320B. Each of units 302 also includes two pivotable (Arrows T in FIG. 15) oscillating arms 328 although for simplicity only four of arms 328 are shown in FIGS. 17-19, and are particularly denoted at 328A-D. Thus, unit 302A includes the pair of arms 328A and 328B, while unit 302B includes the pair of arms 328C and 328D. Each unit 302 is positioned axially between a pair of adjacent flywheels 18. For example, unit 302A is axially intermediate flywheels 18A and 18B and their corresponding magnets 20A and 20B whereby arms 328A and 328B are likewise axially between the adjacent pair of flywheels 18A and 18B and their corresponding magnets 20A and 20B, as viewed perpendicular to the axial direction. Each unit 302 further includes first and second electric generation sections 330A and 330B which in the exemplary embodiment are primarily respectively to the right and left of and adjacent upright 310. Each section 330 includes an electric coil assembly 332 and a generating magnet assembly 334 each of which includes one or more generating magnets 30 (FIGS. 20-21).

With primary reference to FIG. 18, rebound assemblies 322 and 324 are described in greater detail. Each lower magnet mount 314 includes a horizontal axial mounting plate or bar 336 which extends forward and rearward from the main pedestal of the mount. A pair of rigid spaced mounting arms 337 are rigidly secured to and extend longitudinally outwardly from bar 336 with forward and rearward rebound units 338A and 338B mounted respectively thereon. Each unit 338 includes a rigid annular sleeve 340 which is rigidly secured to arm 337 and extends downwardly therefrom. Sleeve 340 has a cylindrical inner surface defining a passage 342 extending from the top to the bottom of sleeve 340 and aligned with a hole 339 formed through arm 337. A coil spring 344 is mounted with its lower end atop the upper surface of arm 337 and extending upwardly therefrom to an upper end. Coil spring 344 is typically formed of spring metal. Spring 344 defines a vertical passage 346 from its top to its bottom end aligned with hole 339 and passage 342. A rigid vertical rod 348 extends through passages 342 and 346 as well as hole 339. Enlarged lower and upper rigid heads 350 and 352 are respectively secured to the lower and upper ends of rod 348 and extend radially outwardly therefrom. An elastomeric pad 354 is secured to the top of upper head 352 and extends upwardly therefrom a short distance. Pad 354 is thus formed of a resilient, flexible, compressible material such as rubber or another elastomer and serves as a rebound member, bumper, dampener or the like. Rod 348, heads 350 and 352 and pad 354 together form a movable member which is vertically movable along a vertical axis V between a raised unactivated home resting position shown in FIG. 18 and a lowered activated position shown in FIG. 23. Spring 344 biases the movable member to its raised home resting position.

With continued reference to FIG. 18, upper rebound assembly 324 is described. A rigid horizontal axial plate or bar 356 is secured adjacent an end of a crossbar 312 adjacent the magnet mount 316 and extends forward and rearwardly from crossbar 312. A pair of rigid spaced arms 357 are rigidly secured to bar 356 and extend longitudinally outwardly therefrom. Bar 356 and arms 357 of frame 12A thus serve as mounts with forward and rearward upper rebound units 358A and 358B mounted on arms 357. Units 358 are similar to and inverted relative to units 338. Each unit 358 has a rigid sleeve 360 secured to and extending upwardly from the top of arm 357 and having an inner surface defining a vertical passage 362 extending from its top to its bottom and aligned with a hole 359 formed in arm 357 from its top to its bottom. A coil spring 364 typically formed of spring metal is mounted with its upper end abutting the bottom of arm 357 and extending downwardly therefrom to a bottom end. Spring 364 defines a vertical passage 366 extending from its top to its bottom and aligned with hole 359 and passage 362. A rigid vertical rod 368 is received through passages 362 and 366 and hole 359. Lower and upper rigid enlarged heads 370 and 372 are respectively secured to the lower and upper ends of rod 368 and extend radially outwardly therefrom. An elastomeric pad 374 typically formed of the same material as pad 354 is secured to the bottom of lower head 370 and extends downwardly therefrom a short distance and serves the same purpose as pad 354. Rod 368, heads 370 and 372 and pad 374 together form a movable member which is vertically movable along a respective vertical axis V between a lowered unactivated home resting position shown in FIG. 18 and a raised activated position shown in FIG. 22. Spring 364 biases this movable member to the lowered home resting position.

Figure 15:
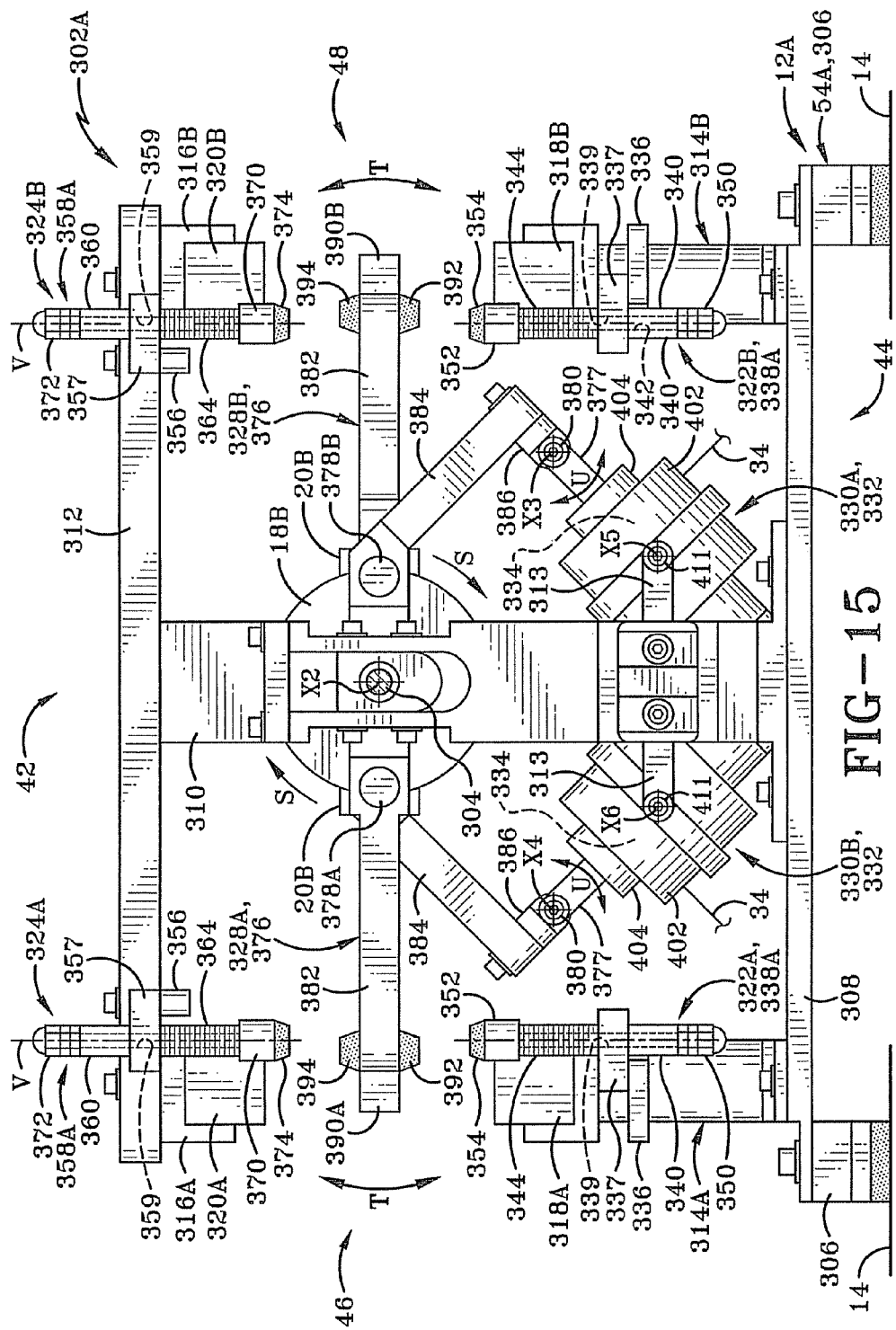
FIG. 15 is a sectional view taken on line 15-15 of FIG. 14 looking rearwardly in the axial direction.

With primary reference to FIGS. 15 and 17-19, arms 328 are described in greater detail. Arms 328 are similar to arms 28 of the earlier embodiments as to the overall shape. However, one manner in which arms 328 differ from arms 28 is that arms 328 include first and second rigid segments 376 and 377 which are pivotally connected at a pivot 380 whereby segments 376 and 377 are pivotable relative to one another (Arrows U in FIG. 15) about a horizontal axially extending axis X3 or X4 which is parallel to axes X1 and X2. FIG. 15 shows arms 328 in a home resting position. Each of arms 328 is pivotable back and forth in first and second or forward and reverse directions whereby each arm 328 is pivotable back and forth in an oscillating manner. Alternately, each arm 328 may be said to pivot back and forth in clockwise and counterclockwise directions about axis X. More particularly, each arm 328 is pivotally mounted on drive shaft 304 and is pivotable relative thereto. Thus, each arm 328 is also pivotable relative to flywheels 18, magnets 20, and frame 12A including rails 306, crossbars 308 and 312, upright 310 and magnet mounts 314 and 316. Each arm 328 is also pivotable relative to rebound assemblies 322 and 324 and coil assembly 332. Each arm 328 includes a first leg 382, a second leg 384 which is rigidly secured to one end of leg 382 and angles downwardly and longitudinally outwardly therefrom, and a third leg 386 which is rigidly secured to the lower outer end of second leg 384 and angles downwardly and longitudinally inwardly therefrom. First and second legs 382 and 384 are part of segment 376. Third leg includes segment 377 and a portion of segment 376 on which segment 377 is pivotally mounted. In the home resting position of arm 328, the first leg 382 as viewed in the axial direction (FIG. 15) is straight and horizontal and includes a primary portion which extends outwardly longitudinally in one direction away from drive shaft 304 and a shorter section which extends in the opposite direction longitudinally away from shaft 304.

Left and right follower magnets 388A and 388B are spaced radially outwardly from axis X2 and shaft 304 and are rigidly mounted on first leg 382 of arm 328 on opposite sides of shaft 304. Follower magnets 388 are generally adjacent drive shaft 304. A left repelling magnet 390A is rigidly mounted on the left end of first leg 382 of arm 328A directly between left lower and upper repelling magnets 318A and 320A. Similarly, a right repelling magnet 390B is rigidly mounted on the right end of first leg 382 of arm 328B directly between right lower and upper repelling magnets 318B and 320B. Repelling magnet 390 may be a single magnet or a plurality of magnets. Repelling magnets 318A, 320A and 390A are oriented so that lower magnet 318A repels magnet 390A and thus the end of arm 328 to which magnet 390 is attached upwardly away from magnet 318A when magnet 390A is sufficiently close to magnet 318A for interaction of the magnetic fields thereof. Similarly, upper repelling magnet 320A and magnet 390A are oriented to provide a downward repelling force of magnet 390A and the left end of arm 328 away from magnet 320A when magnet 390A is sufficiently close to magnet 320A. Repelling magnets 318B, 320B and 390B interact in the same manner as repelling magnets 318A, 320A and 390A with respect to the repelling movement of magnet 390B and the right end of arm 328B.

Figure 22:
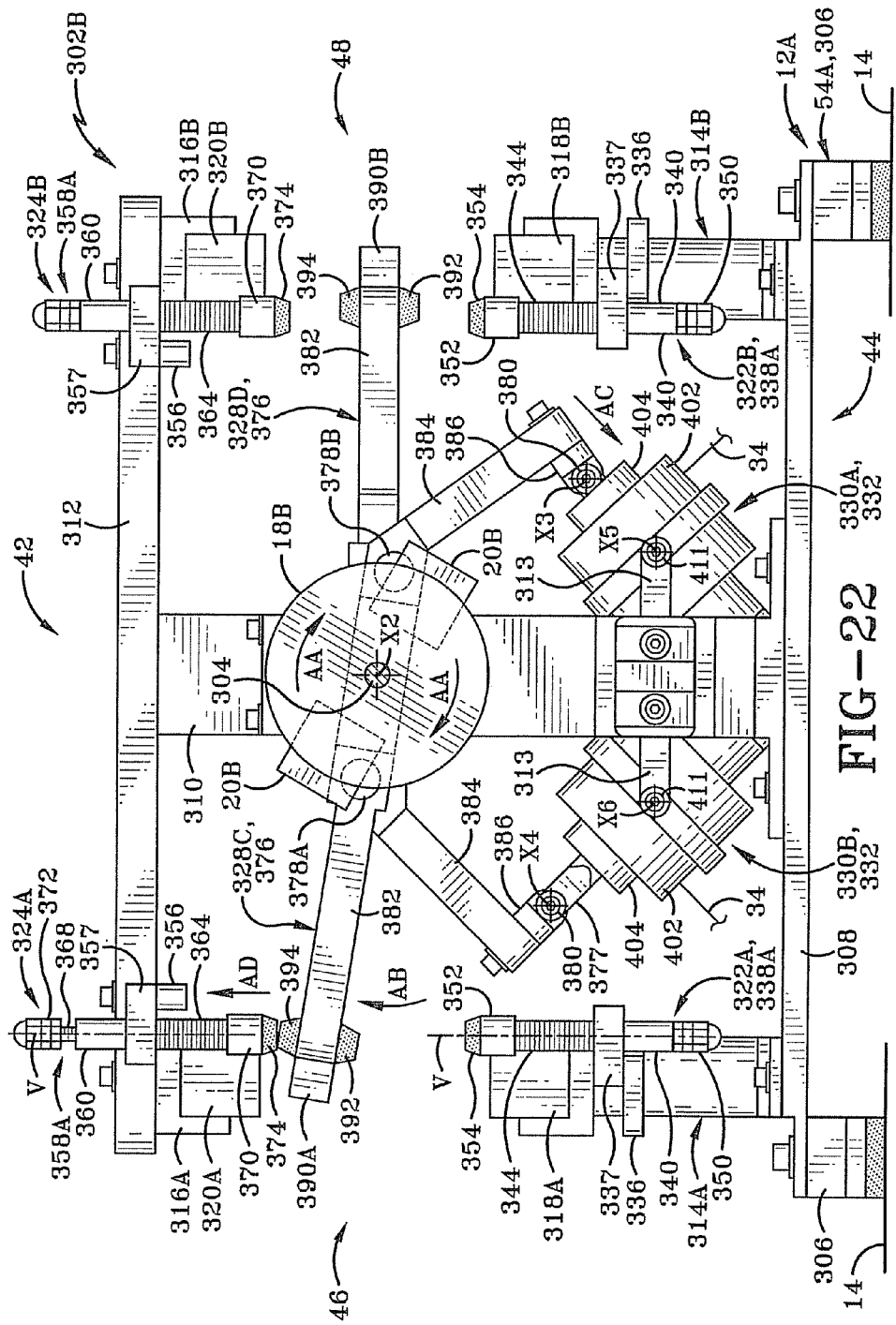
FIG. 22 is a sectional view taken on line 22-22 of FIG. 14 showing one stage of operation of the third embodiment.

Lower and upper elastomeric pads 392 and 394 are secured respectively to the bottom and top of the outer ends of the respective leg 382 of each arm 328 and extend respectively downwardly and upwardly therefrom. Pads 392 and 394 are formed of the same material as pads 354 and 374. In the home resting position of arm 328A, the corresponding pads 392 and 394 are substantially directly between pads 354 and 374 with lower pad 292 spaced upwardly from pad 354 and with upper pad 394 spaced downwardly from pad 374. Pad 394 is positioned so that upward pivotal movement of arm 328A causes pad 394 to move from a disengaged position in which pad 394 is disengaged from or out of contact with pad 374 (FIG. 15) to an engaged position in which pad 394 engages pad 374 (FIG. 22). Lower pad 392 is positioned so that rotation in the opposite direction moves pad 392 from a disengaged position (FIG. 15) in which pads 392 and 354 are disengaged or out of contact with one another to an engaged position (FIG. 23) in which pads 392 and 354 engage one another. The pivotal movement of other arms 328, such as arm 328B likewise moves the pads 392 and 394 between disengaged and engaged positions in a similar fashion with respect to pads 354 and 374 on the right side of the oscillator.

Turning now again to FIG. 16, the relative positions of drive magnets 20 and follower magnets 378 is discussed. As noted previously, the drive magnets 20 of the various flywheels 18 are sequentially circumferentially offset from one another. FIG. 16 shows in dot dashed lines the home position of the follower magnets 378A and 378B which are mounted on each of arms 328. As discussed in greater detail below, magnets 378A and B of a given arm 328 move in response to movement of the corresponding magnets 20 of the flywheel 18 which is closest to the given magnets 378 and arm 328. When all of arms 328 are in the home position, magnets 378A on the various arms 328 are circumferentially aligned along a common horizontal axial line. Follower magnets 378B of the various arms 328 are also aligned in the same manner in the home resting position of arms 328. Thus, when the flywheels 18A-F are positioned as illustrated in FIGS. 14 and 16, magnets 20B of flywheel 18B and magnets 20F of flywheel 18F are respectively aligned with the follower magnets 378A and 378B along respective horizontal axial lines whereas the magnets 20A, 20C, 20D and 20E are circumferentially offset from follower magnets 378A and 378B. Thus, the dot dashed lines in FIG. 16 which represent the central radius of magnets 20B and 20F also serve as the central radius passing through the center of magnets 378A and 378B respectively. Thus, the central radius of magnet 20A or 20E is circumferentially offset in the clockwise direction from the central radius of follower magnet 378B by circumferential width CW. In addition, relative to the central radius of magnet 378B, the central radius of magnet 20C is offset in the counterclockwise direction by circumferential width CW, the central radius of magnet 20D is offset by two times width CW and the central radius of the other magnets 320A and 20E are offset three times width CW.

With reference to FIGS. 20 and 21, magnet assembly 334 is secured to second segment 377 of arm 328. As previously noted, assembly 334 includes one or more magnets 30. In addition, assembly 334 may include a bushing 335 which may serve as an additional weight. In the exemplary embodiment, magnet 30 and bushing 335 abut one another and are rigidly secured to and extend radially outwardly from segment 377 to respective circular or cylindrical outer surfaces.

With primary reference to FIGS. 15, 20 and 21, coil assembly 332 is described in greater detail. Assembly 332 includes an electrically conductive generating coil 396 which is formed of multiple windings by winding the electrically conductive member or wire 34 multiple times as will be understood in the art of electrical generators. Coil 396 has a cylindrical inner surface 398 defining a cylindrical coil passage 400. Assembly 332 further includes a rigid outer sleeve 402, a rigid inner sleeve 404, and rigid annular end members 406 rigidly secured to and extending radially inwardly from the respective ends of outer sleeve 402 to a rigid connection with the outer surface of inner sleeve 404 such that sleeves 402 and 404 and end members 406 define there within a coil interior chamber 408 in which coil 396 is disposed. Outer sleeve 402 thus circumscribes coil 396, which circumscribes inner sleeve 404, which is disposed within coil passage 400 and extends outwardly therefrom in opposed directions. A rigid mounting member in the form of a mounting ring 410 is rigidly secured to and extends radially outwardly from the outer surface of outer sleeve 402 and is pivotally connected at a pivot 411 (FIG. 15) to mounting bracket 313 whereby assembly 332 is pivotally mounted on bracket 313 to pivot about a horizontal axially extending axis which is parallel to axes X1-X4. More particularly, as shown in FIG. 15, the assembly 332 associated with arm 328A pivots about an axis X5 to the right of upright 310 whereas the assembly 332 associated with arm 328B pivots about an axis X6 to the left of upright 310. Returning to FIG. 21, inner sleeve 404 has a cylindrical annular inner surface 412 defining a cylindrical sleeve passage 414 having an upper entrance opening 415 through which magnet or magnets 30 or bushing 335 of assembly 334 and segment 377 of arm 328 are insertable and removable from sleeve passage 414. Magnet 30 and bushing 335 may remain entirely within passage 414 during operation. A repelling magnet 416 is rigidly secured to inner sleeve 404 at its lower end opposite entrance opening 415. Repelling magnet 416 serves to repel magnet 30 to move magnet 30 away from magnet 416 via interaction of the magnetic fields of the two magnets. Magnet assembly 334 is thus slidably receivable to move back and forth (Arrow W in FIG. 21) within passage 414 whereby there is a sliding engagement between the cylindrical outer surface of magnets 30 and/or bushing 335 of assembly 334 and inner surface 412 during the oscillating movement of arm 428.

Figure 23:
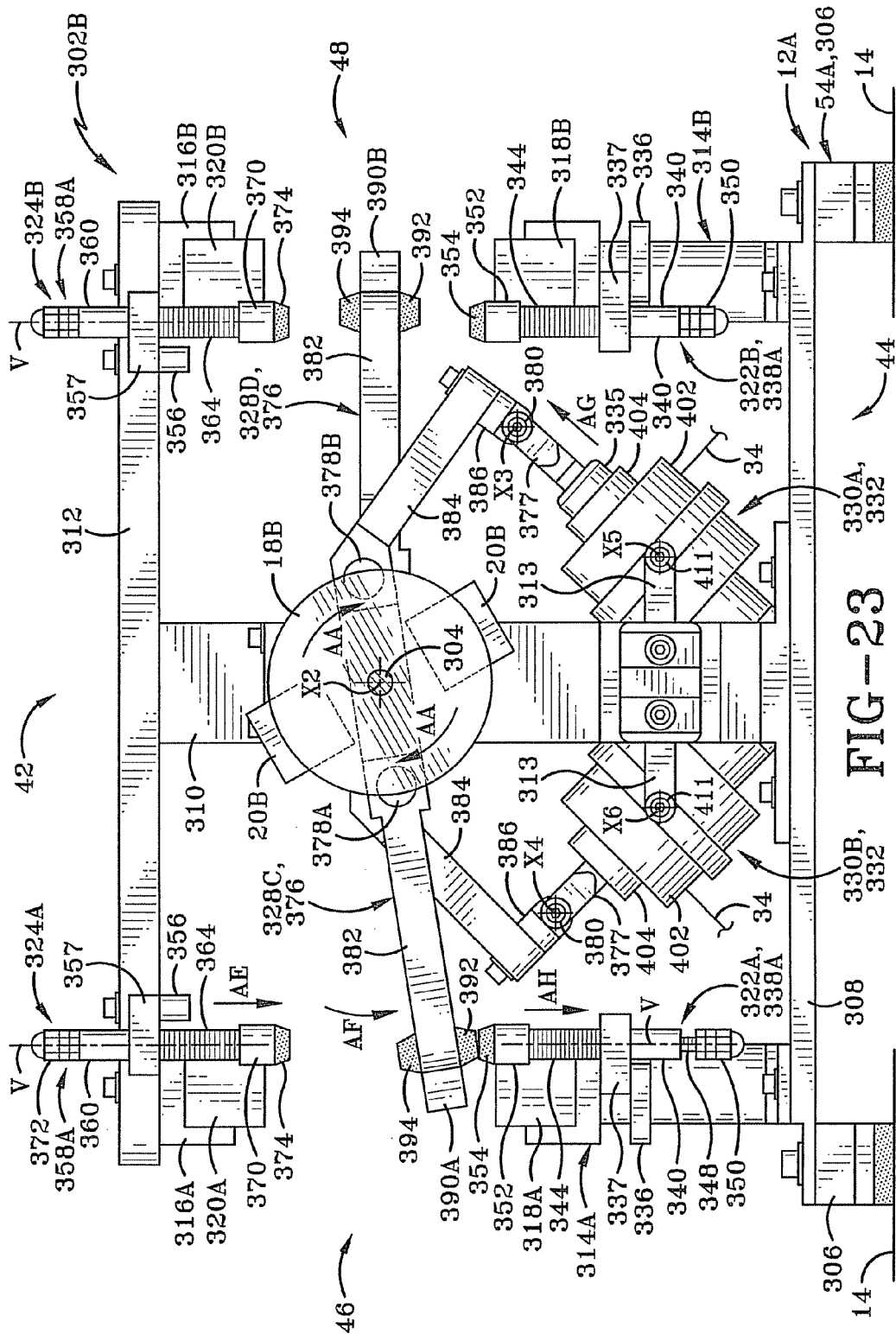
FIG. 23 is similar to FIG. 22 and shows a subsequent stage of operation.

Operation of oscillator 300 is now described with primary reference to FIGS. 22 and 23. Drive mechanism 16A (FIG. 14) is operated to provide continuous rotational input to drive shaft 304. Drive shaft 304 thus rotates along with all of the flywheels 18 and magnets 20 about axis X2 as shown at Arrows AA in FIG. 22, which shows in particular flywheel 18B and magnets 20B. A rotation of drive magnets 20B in the clockwise direction initially causes the clockwise pivotal movement of arm 328C (Arrow AB) about axis X2 via the interaction between magnets 20B and follower magnets 378A and B. In the exemplary embodiment, magnets 20B and 278 are oriented such that each magnet 20B attracts magnet 378 as the magnetic fields thereof interact with one another. However, the magnets may be oriented to repel one another and still provide a similar effect such that the corresponding arm 328 would pivot in response to the interaction between the drive magnets 20 and the follower magnets 378. The clockwise pivotal movement of arm 328C causes generating magnet assembly 334 to slide downwardly and longitudinally inwardly (Arrow AC) within the sleeve passage 414 and within the coil passage 400 of coil 396, thus producing an electric current within the electrically conductive member 34 forming coil 396 such that the electric current may be used for any suitable purpose. As magnet assembly 334 moves within coil assembly 332, assembly 334 and segment 377 pivot relative to segment 376 of arm 328C about axis X3 and coil assembly 32 pivots about axis X5 in response to pivotal movement of arm 328C about axis X2.

The clockwise pivotal movement of arm 328C also moves the left side of the arm along with repelling magnet 390A and pads 392 and 394 upwardly such that pad 394 engages pad 374 and moves the movable member including rod 368 upwardly (Arrow AD) against the downward spring bias of spring 364. Pads 374 and 394 thus absorb some of the shock of the impact therebetween, as does spring 364. The clockwise pivotal movement also moves magnet 390A upwardly adjacent repelling magnet 320A, whereby a repelling force between magnets 320A and 390A is created which pushes magnet 390A and the corresponding portion of arm 328C downwardly to facilitate the reversal and thus counterclockwise pivoting movement of arm 328C. The repelling magnets 320A and 390A thus react the clockwise pivotal movement of arms 328C. In addition, spring 364 applies a downward force on lower head 370 which is transferred via pads 374 and 394 to arm 328C, thereby reacting the clockwise pivotal movement of the arm and facilitating the reversal thereof to rotate counterclockwise. The engagement of pads 374 and 394 with one another causes each of the pads to be compressed somewhat. The elastomer of which each of these pad is formed is resilient and thus tends to return to its original resting state, which in this case involves the decompression of the elastomer of which the pads are formed, which also adds to the reacting of the clockwise movement of arm 328C and facilitates its reversal even though the degree to which these pads facilitate the reaction and reversal are much smaller than that provided by spring 354 and the repelling magnets 320A and 390A. Typically, magnets 320A and 390A provide the primary reactive and reversing force which cause the reversal of the pivoting movement of arm 328C. However, the upper rebound assembly 324 helps ensure a smooth transition and prevents magnet 390A from impacting magnet 320A. As shown in FIG. 22, drive magnets 20B are generally aligned with follower magnets 378 and are moving clockwise away from this aligned position. FIG. 23 shows that magnets 20B have moved clockwise out of alignment with follow magnets 378 such that magnets 20B have little to no magnetic effect on magnets 378 and are thus not driving the clockwise pivotal movement of arm 328C at this point. Thus, the repelling force created between magnets 320A and 390A as they approach one another in FIG. 22 repels the left side of arm 328C downwardly to cause a counterclockwise pivotal movement thereof, along with the force applied by spring 364 and pads 374 and 394. The repelling or reacting force applied by the repelling magnets 320A and 390A and rebound assembly 322 is illustrated at Arrow AE in FIG. 23. Thus, the counterclockwise pivotal movement of arm 328C (Arrow AF) occurs as drive shaft 304, flywheels 18 and magnets 20 continues to rotate in the clockwise direction as shown at Arrows AA in FIG. 23. This counterclockwise movement of arm 328C causes magnet assembly 334 and segment 377 to slidably move in the opposite direction within passage 414 (FIG. 21) upwardly and longitudinally outwardly, as shown at Arrow AG in FIG. 23. Thus, the movement of assembly 334 relative to coil 396 and the remainder of assembly 332 continues to produce an electric current within the coil and wire 34 thereof. The back and forth movement of assembly 334 relative to coil 396 thus produces an alternating current in the electrically conductive metal.

The counterclockwise movement of arm 328 thus moves repelling magnet 390A downwardly toward repelling magnet 318A and moves pads 392 and 394 downwardly such that pad 392 engages pad 354 such that said pads are compressed somewhat and so that the movable assembly including rod 348 moves vertically downwardly (Arrow AH) against the spring bias of spring 344. As with the upper rebound assembly, the lower rebound assembly 322 and the repelling interaction between magnets 318A and 390A reacts the counterclockwise movement and facilitates the reversal thereof such that arm 328C is encouraged to move in the clockwise pivotal direction. In addition, magnets 20B once again interact with magnets 378A and 378B as the drive shaft and flywheels continue to rotate in the clockwise direction to facilitate the clockwise pivoting movement of arm 328C. Thus, arm 328C pivots back and forth in the clockwise and counterclockwise directions in an oscillating fashion whereby generation section 330A produces an alternating current.

The operation of oscillator 300 has thus far been described with respect to the pivotal movement of arm 328C only. However, the various magnets 20 drive respective pivoting arms 328 back and forth in the same manner and thus likewise produce electrical alternating current with the corresponding generation sections 330. More particularly, each set of magnets of a given flywheel drives two of the pivoting arms 328 simultaneously in a synchronized fashion such that these two arms move in the same manner at the same time, that is, in unison. For instance and with reference to FIGS. 18 and 19, the drive magnets 20B of flywheel 18B drive the pivotal movement of arms 328B and 328C in unison via the interaction of magnets 20B and the magnets 378 which are carried respectively by arms 328B and 328C. Similarly, as will be evident from FIG. 14, the magnets 20C of flywheel 18C drives the pivotal movement of one arm 328 of unit 302B which is forward of flywheel 18C and one arm of unit 302C which is rearward of flywheel 18C in unison. Similarly, the rotation of flywheel 18D and magnets 20D causes the pivotal movement of the forward and rearward arms 328 respectively of units 302C and 302D. In the configuration shown in FIG. 14, only magnets 20A and magnets 20F would cause a single arm 328 to pivot inasmuch as there are no pivoting arms forward of flywheel 18A or rearward of flywheel 18F although oscillator 300 may be modified to that effect.

Thus, while a given one of flywheels 18, such as flywheel 18B and the associated magnets 20B cause a pair of arms 328 to pivot in unison with one another, the other flywheels and associated drive magnets 20 cause another pair of arms 228 to pivot back and forth in unison with one another, but not in unison with the pivot arms driven by magnets 20 of other flywheels which are circumferentially offset from the magnets 20 of the given flywheel. Thus for instance, magnets 20B at the position shown in FIGS. 14 and 16 are aligned with the corresponding magnets 378 of the two closest corresponding arms 328 while magnets 20C are not aligned with the corresponding magnets 378 and more particularly in the exemplary embodiment are 45 degrees counterclockwise thereof, and magnets 20D of flywheel 18D are likewise not aligned with the corresponding follower magnets 378 and in the exemplary embodiment are 90 degrees counterclockwise thereof while magnets 20E of the flywheel 18E are 135 degrees counterclockwise of the corresponding magnets 378.

In short, oscillator 300 is configured to smoothly translate the continuous clockwise rotational movement of drive shaft 304 and flywheels 18A-F to pivotal back and forth movement of arms 328 of units 302A-E via the interaction of drive magnets 20 and follower magnets 378 along with the operation of the repelling magnets and rebound assemblies as previously discussed. In addition, oscillator 300 is configured for producing alternating current in each of its electric generation stations 330. The position of the various sets of magnets 20 relative to the follower magnets 378 is staggered as discussed above so that the interaction between the magnets 20 and the corresponding follower magnets 378 does not all occur simultaneously inasmuch as this would unduly hinder the rotational movement of magnets 20 as they interacted with magnets 378.

It is noted that the various magnets described herein may be permanent magnets or electromagnets. It is also noted that various changes may be made to oscillator 300 which are within the scope of the present invention. One of such changes includes the general reversal of the mounting of the coil assembly 332 and magnet assembly 334. More particularly, a coil assembly may be securely mounted to one of arms 328 to pivot back and forth therewith while the generator assembly may be mounted on the frame in a manner similar to the mounting of coil assembly 332. Other variations will be evident to one skilled in the art.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An apparatus comprising:
a rotatable drive shaft;
a first drive magnet which rotates with the drive shaft;
a first pivotable oscillating arm; and
a follower magnet on the first aim which is movable in response to rotational movement of the drive magnet so as to cause the first arm to pivot back and forth in an oscillating manner; wherein the drive shaft is rotatable about a first axis; and the first arm is pivotable about the first axis.

2. The apparatus of claim 1 further comprising
a second pivotable oscillating arm; and
a follower magnet on the second arm which is movable in response to rotational movement of the first drive magnet so as to cause the second arm to pivot back and forth in an oscillating manner.

3. The apparatus of claim 1 wherein the first axis extends in an axial direction; and further comprising
a second drive magnet which rotates with the drive shaft and is axially spaced from the first drive magnet;
a second pivotable oscillating arm; and
a follower magnet on the second arm which is movable in response to rotational movement of the second drive magnet so as to cause the second arm to pivot back and forth in an oscillating manner.

4. The apparatus of claim 1 further comprising
a frame; and
a first elastomeric pad on one of the frame and first oscillating arm which reacts oscillating movement of the first oscillating arm.

5. An apparatus comprising:
a rotatable drive shaft;
a first drive magnet which rotates with the drive shaft;
a first pivotable oscillating arm;
a follower magnet on the first arm which is movable in response to rotational movement of the drive magnet so as to cause the first arm to pivot back and forth in an oscillating manner;
a second pivotable oscillating arm; and
a follower magnet on the second arm which is movable in response to rotational movement of the first drive magnet so as to cause the second arm to pivot back and forth in an oscillating manner;
wherein the first and second arms are pivotable about a common axis.

6. An apparatus comprising:
a rotatable drive shaft;
a first drive magnet which rotates with the drive shaft;
a first pivotable oscillating arm;
a follower magnet on the first arm which is movable in response to rotational movement of the drive magnet so as to cause the first arm to pivot back and forth in an oscillating manner;
wherein the drive shaft is rotatable about an axis which extends in an axial direction; and further comprising
a second drive magnet which rotates with the drive shaft and is axially spaced from the first drive magnet;
a second pivotable oscillating arm;
a follower magnet on the second arm which is movable in response to rotational movement of the second drive magnet so as to cause the second arm to pivot back and forth in an oscillating manner;
a first circumferential position of the first drive magnet; and
a second circumferential position of the second drive magnet which is fixed relative to and circumferentially offset from the first circumferential position.

7. The apparatus of claim 6 wherein the drive shaft is rotatable about a first axis; and the first arm is pivotable about the first axis.

8. The apparatus of claim 6 further comprising
a third drive magnet which rotates with the drive shaft and is axially spaced from the first and second drive magnets;
a third pivotable oscillating arm; and
a follower magnet on the third arm which is movable in response to rotational movement of the third drive magnet so as to cause the third arm to pivot back and forth in an oscillating manner;
a third circumferential position of the third drive magnet which is fixed relative to and circumferentially offset from the first and second circumferential positions.

9. An apparatus comprising:
a rotatable drive shaft;
a first drive magnet which rotates with the drive shaft;
a first pivotable oscillating arm:
a follower magnet on the first arm which is movable in response to rotational movement of the drive a net so as to cause the first arm to sivot back and forth in an oscillating manner;

wherein the drive shaft is rotatable about an axis which extends in an axial direction; and further comprising a second drive magnet which rotates with the drive shaft and is axially spaced from the first drive magnet;

a second pivotable oscillating arm;

a follower magnet on the second arm which is movable in response to rotational movement of the second drive magnet so as to cause the second arm to pivot back and forth in an oscillating manner;

wherein the first and second arms are between the first and second drive magnets as viewed perpendicular to the axis.

10. An apparatus comprising:

a rotatable drive shaft a first drive magnet which rotates with the drive shaft;

a first pivotable oscillating arm;

a follower magnet on the first arm which is movable in response to rotational movement of the drive magnet so as to cause the first arm to pivot back and forth in an oscillating manner;

a frame;

a generating magnet which is mounted on one of the frame and first oscillating arm; and an electrically conductive member which is mounted on the other of the frame and first oscillating arm and in which an electric current is produced in response to oscillating movement of the first oscillating arm to move the one of the generating magnet and electrically conductive member relative to the other of the generating magnet and electrically conductive member.

11. The apparatus of claim 10 further comprising a repelling magnet mounted adjacent the electrically conductive member for repelling the generating magnet to limit oscillating travel of the first oscillating arm in one direction.

12. The apparatus of claim 10 further comprising a first segment of the first oscillating arm; and a second segment of the first oscillating arm which is pivotable relative to the first segment and which carries the one of the generating magnet and electrically conductive member.

13. The apparatus of claim 10 further comprising a pivot about which the electrically conductive member is pivotally mounted.

14. The apparatus of claim 10 further comprising a coil which is formed by the electrically conductive member and which defines a coil passage;

a sleeve in the coil passage having an inner surface defining a sleeve passage;

a generating magnet assembly which comprises the generating magnet; and a sliding engagement between the generating magnet assembly and the inner surface of the sleeve.

15. An apparatus comprising:

a rotatable drive shaft;

a first drive magnet which rotates with the drive shaft;

a first pivotable oscillating arm;

a follower magnet on the first arm which is movable in response to rotational movement of the drive magnet so as to cause the first arm to pivot back and forth in an oscillating manner;

at least one first repelling magnet on the first arm;

a second repelling magnet spaced from the at least one first repelling magnet for repelling the at least one first repelling magnet to limit oscillating travel of the first arm in a first direction.

16. The apparatus of claim 15 wherein the second repelling magnet is on one side of the at least one first repelling magnet; and further comprising a third repelling magnet spaced from and on an opposed side of the at least one first repelling magnet for repelling the at least one first repelling magnet to limit oscillating travel of the first arm in a second direction opposite the first direction.

17. The apparatus of claim 15 further comprising a spring for reacting oscillating travel of the first arm in the first direction.

18. An apparatus comprising:

a rotatable drive shaft;

a first drive magnet which rotates with the drive shaft;

a first pivotable oscillating arm;

a follower magnet on the first arm which is movable in response to rotational movement of the drive magnet so as to cause the first arm to pivot back and forth in an oscillating manner;

a frame;

a first elastomeric pad on one of the frame and first oscillating arm which reacts oscillating movement of the first oscillating arm; and a second elastomeric pad on the other of the frame and first oscillating arm which abuts the first pad to react oscillating movement of the first oscillating arm.

19. The apparatus of 10 wherein the drive shaft is rotatable about a first axis; and the first arm is pivotable about the first axis.

20. The apparatus of 15 wherein the drive shaft is rotatable about a first axis; and the first arm is pivotable about the first axis.

* * * * *

UNITED STATES PATENT AND TRADEMARK OFFICE
CERTIFICATE OF CORRECTION

PATENT NO. : 8,760,020 B2  Page 1 of 1
APPLICATION NO. : 13/042558
DATED : June 24, 2014
INVENTOR(S) : Michael J. Froelich It is certified that error appears in the above-identified patent and that said Letters Patent is hereby corrected as shown below:

In the Claims

Column 17, line 49, (Claim 1) change "aim" to --arm--.

Column 18, line 65, (Claim 9) change "a net" to --magnet--.

Column 18, line 66, (Claim 9) change "sivot" to --pivot--.

Signed and Sealed this
Twenty-fifth Day of November, 2014

Michelle K. Lee
*Deputy Director of the United States Patent and Trademark Office*